(12) United States Patent
Takase et al.

(10) Patent No.: US 10,541,444 B2
(45) Date of Patent: Jan. 21, 2020

(54) RECHARGEABLE LITHIUM BATTERY

(71) Applicant: SAMSUNG SDI CO., LTD., Yongin-si, Gyeonggi-do (KR)

(72) Inventors: Hironari Takase, Yokohama (JP); Hokuto Yokotsuji, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 736 days.

(21) Appl. No.: 14/940,078

(22) Filed: Nov. 12, 2015

(65) Prior Publication Data

US 2016/0190644 A1    Jun. 30, 2016

(30) Foreign Application Priority Data

Dec. 26, 2014   (JP) .................................. 2014-265030
Jul. 3, 2015    (KR) ......................... 10-2015-0095121

(51) Int. Cl.
| | | |
|---|---|---|
| H01M 10/0567 | (2010.01) | |
| H01M 4/40 | (2006.01) | |
| H01M 4/38 | (2006.01) | |
| H01M 4/583 | (2010.01) | |
| H01M 4/525 | (2010.01) | |
| H01M 10/0525 | (2010.01) | |
| H01M 10/0569 | (2010.01) | |

(52) U.S. Cl.
CPC ....... *H01M 10/0567* (2013.01); *H01M 4/386* (2013.01); *H01M 4/387* (2013.01); *H01M 4/405* (2013.01); *H01M 4/525* (2013.01); *H01M 4/583* (2013.01); *H01M 10/0525* (2013.01); *H01M 10/0569* (2013.01); *H01M 2220/30* (2013.01); *H01M 2300/0034* (2013.01)

(58) Field of Classification Search
CPC ......... H01M 10/0567; H01M 10/0569; H01M 10/0525; H01M 4/525; H01M 4/583; H01M 4/386; H01M 4/387; H01M 4/405; H01M 2300/0034; H01M 2220/30
See application file for complete search history.

(56) References Cited

U.S. PATENT DOCUMENTS

| | | | |
|---|---|---|---|
| 8,586,250 | B2 | 11/2013 | Iwaya |
| 8,956,768 | B2 | 2/2015 | Iwaya |
| 9,023,536 | B2 | 5/2015 | Taki et al. |
| 9,337,511 | B2 | 5/2016 | Taki et al. |
| 2013/0040185 | A1 | 2/2013 | Takase |
| 2013/0236777 | A1* | 9/2013 | Taki ................. H01M 10/0567 429/200 |
| 2013/0323605 | A1 | 12/2013 | Yamamoto et al. |
| 2014/0199602 | A1 | 7/2014 | Kim et al. |

FOREIGN PATENT DOCUMENTS

| | | |
|---|---|---|
| CN | 102017273 A | 4/2011 |
| CN | 103181017 A | 6/2013 |
| CN | 103339783 A | 10/2013 |
| CN | 103456993 A | 12/2013 |
| CN | 103797635 A | 5/2014 |
| CN | 103928708 A | 7/2014 |
| EP | 2775559 A1 | 9/2014 |
| JP | 2011-129352 A | 6/2011 |
| JP | 2012-109091 * | 6/2012 |
| JP | 2012-109092 A | 6/2012 |
| JP | 2013-37905 A | 2/2013 |
| JP | 2013-118168 A | 6/2013 |
| JP | 2013-211095 A | 10/2013 |
| JP | 2014-112526 A | 6/2014 |
| JP | 2015-118852 * | 6/2015 |
| KR | 10-2012-0083274 A | 7/2012 |
| KR | 10-2014-0009306 A | 1/2014 |
| WO | WO 2009/133899 A1 | 11/2009 |

OTHER PUBLICATIONS

Full English Translation of JP 2011-129352 A, published Jun. 30, 2011, 14 pages.

(Continued)

*Primary Examiner* — Laura Weiner
(74) *Attorney, Agent, or Firm* — Lewis Roca Rothgerber Christie LLP

(57) ABSTRACT

A rechargeable lithium battery includes: a positive electrode including a positive active material; and an electrolyte solution including a solvent and an additive, wherein the positive active material includes a lithium-containing transition metal oxide, the solvent includes a hydrofluoroether, and the additive includes a first additive represented by Chemical Formula 1 and at least one selected from a second additive represented by Chemical Formula 2, a third additive represented by Chemical Formula 3, and a fourth additive represented by Chemical Formula 4.

Chemical Formula 1

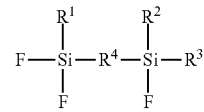

Chemical Formula 2

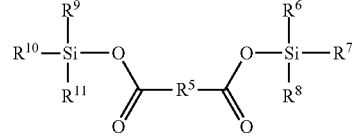

Chemical Formula 3

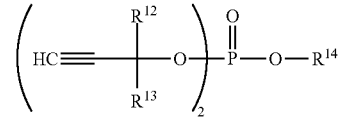

Chemical Formula 4

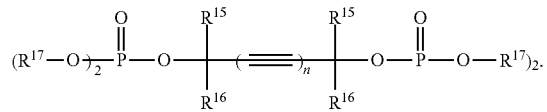

14 Claims, 2 Drawing Sheets

(56) References Cited

OTHER PUBLICATIONS

Full English Translation of JP 2013-211095 A, published Oct. 10, 2013, 25 pages.
Full English Translation of JP 2014-112526 A, published Jun. 19, 2014, 23 pages.
Abstract and English machine translation of Chinese Publication CN 103456993 A dated Dec. 18, 2013, listed above (14 pages).
European Search Report dated May 18, 2016, corresponding to European Patent application 15196108.3, (10 pages).
Hu et al "Fluorinated electrolytes for Li-ion battery: An FEC-based electrolyte for high voltage $LiNi_{0.5}Mn_{1.5}O_4$/graphite couple" Electrochemistry Communications, vol. 35, Aug. 14, 2013, pp. 76-79.
Xu, Kang, "Nonaqueous Liquid Electrolytes for Lithium-Based Rechargeable Batteries," Chemical Reviews, 2004, vol. 104, No. 10, pp. 4303-4418, XP055139331.
EPO Office Action dated Apr. 9, 2018, for corresponding European Patent Application No. 15196108.3 (9 pages).
JPO Office Action dated Jul. 3, 2018, for corresponding Japanese Patent Application No. 2014-265030 (3 pages).
Chinese Office Action, with English translation, dated Nov. 29, 2018, for corresponding Chinese Patent Application No. 201510983176.8 (25 pages).
Chinese Patent Office Action with English Translation dated Jul. 19, 2019, and the accompanying Search Report dated Jul. 12, 2019, for corresponding Chinese Patent Application No. 201510983176.8, 23 pages.

\* cited by examiner

Example 1

Comparative Example 1

RECHARGEABLE LITHIUM BATTERY

CROSS-REFERENCE TO RELATED APPLICATIONS

This application claims priority to and the benefit of Japanese Patent Application No. 2014-265030 filed in the Japanese Patent Office on Dec. 26, 2014, and Korean Patent Application No. 10-2015-0095121 filed in the Korean Intellectual Property Office on Jul. 3, 2015, the entire content of each of which is incorporated herein by reference.

BACKGROUND

1. Field

One or more aspects of embodiments of the present disclosure are directed toward a rechargeable lithium battery.

2. Description of the Related Art

A rechargeable lithium battery may include positive active material layers electrochemically intercalating and deintercalating lithium ions and an electrolyte solution in which lithium ions are dissolved. The electrolyte solution may be impregnated in a porous separator.

For example, a rechargeable lithium battery using a separator having pores having two different characteristics, and including fluorinated ether in the electrolyte solution, has been described as having improved cycle-life.

However, there is intense cost competition in the field of batteries suitable for use in portable electronic devices (e.g., mobile devices) such as smart phones, tablet PCs, and the like. For example, using a solid solution oxide as the positive electrode material may be expensive, and thus a conventional transition metal oxide including lithium such as a lithium cobalt oxide and the like is often used to realize a high voltage battery.

For use in a battery having such positive electrode material, an electrolyte solution including hydrofluoroether has recently been suggested. However, when this electrolyte solution is used for a rechargeable lithium battery using the transition metal oxide including lithium as a positive electrode material, cycle-life and storage characteristics of the battery, when stored at a high temperature, may deteriorate.

SUMMARY

One or more aspects of embodiments of the present disclosure provide a rechargeable lithium battery having improved cycle-life characteristics and storage characteristics at a high temperature.

One embodiment provides a rechargeable lithium battery that includes: a positive electrode including a positive active material; and an electrolyte solution including a solvent and an additive, wherein the positive active material includes a lithium-containing transition metal oxide, the solvent includes hydrofluoroether, and the additive includes a first additive represented by Chemical Formula 1, and at least one selected from a second additive represented by Chemical Formula 2, a third additive represented by Chemical Formula 3, and a fourth additive represented by Chemical Formula 4.

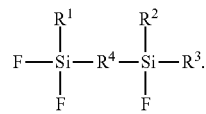

Chemical Formula 1

In Chemical Formula 1, $R^1$ to $R^3$ may be each independently selected from a C1 to C8 alkyl group substituted or unsubstituted with a vinyl group or a C1 to C5 alkyl group and not including a double bond, a C1 to C8 alkyl group substituted or unsubstituted with a vinyl group or a C1 to C5 alkyl group and including a double bond, a C1 to C8 alkyl group, a C2 to C8 alkenyl group, a C5 to C8 cycloalkyl group, a C6 to C8 aryl group, and a fluorine atom, and $R^4$ may be selected from a C1 to C8 alkylene group, a C2 to C8 alkynylene group, a C4 to C8 alkylene group having at least one selected from an ether group and a thioether group, a C1 to C8 alkylene group having a plurality of $-CF_2-$ linking groups, and a C4 to C10 alkylene group having an ether group and a thioether group.

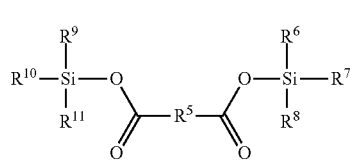

Chemical Formula 2

In Chemical Formula 2,
$R^5$ may be selected from a C2 to C6 alkylene group without a double bond, a C2 to C6 alkylene group with a double bond, and a C6 to C12 arylene group, and
$R^6$ to $R^{11}$ may be each independently selected from a C1 to C6 alkyl group and a C2 to C6 alkenyl group.

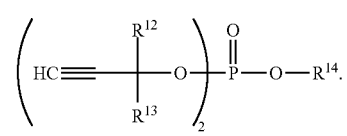

Chemical Formula 3

In Chemical Formula 3,
$R^{12}$ and $R^{13}$ may be each independently selected from hydrogen and a C1 to C8 alkyl group, and
$R^{14}$ may be selected from a C1 to C8 alkyl group substituted or unsubstituted with a vinyl group, a C2 to C8 alkenyl group, a C2 to C8 alkynyl group, and a C1 to C8 halogenated alkyl group.

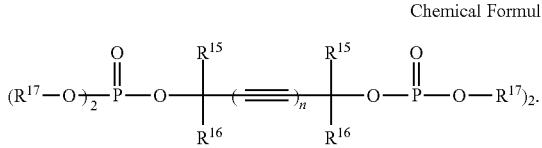

Chemical Formula 4

In Chemical Formula 4,
$R^{15}$ and $R^{16}$ may be each independently selected from hydrogen and a C1 to C8 alkyl group,
$R^{17}$ may be selected from a C1 to C8 alkyl group, a C2 to C8 alkenyl group, a C2 to C8 alkynyl group, and a C1 to C8 halogenated alkyl group, and
n may be 1 or 2.

The hydrofluoroether (HFE) may include 2,2,2-trifluoroethylmethylether ($CF_3CH_2OCH_3$), 2,2,2-trifluoroethyldifluoromethylether ($CF_3CH_2OCHF_2$), 2,2,3,3,3-pentafluoropropylmethylether ($CF_3CF_2CH_2OCH_3$), 2,2,3,3,3-pentafluoropropyldifluoromethylether ($CF_3CF_2CH_2OCHF_2$), 2,2,3,3,3-pentafluoropropyl-1,1,2,2-tetrafluoroethylether ($CF_3CF_2CH_2OCF_2CF_2H$), 1,1,2,2-tetrafluoroethylmethylether ($HCF_2CF_2OCH_3$), 1,1,2,2-tetrafluoroethylethylether ($HCF_2CF_2OCH_2CH_3$), 1,1,2,2-tetrafluoroethylpropylether ($HCF_2CF_2OC_3H_7$), 1,1,2,2-tetrafluoroethylbutylether ($HCF_2CF_2OC_4H_9$), 2,2,3,3-tetrafluoroethyldifluoromethylether ($H(CF_2)_2CH_2O(CF_2)H$), 1,1,2,2-tetrafluoroethylisobutylether ($HCF_2CF_2OCH_2CH(CH_3)_2$), 1,1,2,2-tetrafluoroethylisopentylether ($HCF_2CF_2OCH_2C(CH_3)_3$), 1,1,2,2-tetrafluoroethyl-2,2,2-trifluoroethylether ($HCF_2CF_2OCH_2CF_3$), 1,1,2,2-tetrafluoroethyl-2,2,3,3-tetrafluoropropylether ($HCF_2CF_2OCH_2CF_2CF_2H$), hexafluoroisopropylmethylether (($CF_3)_2CHOCH_3$), 1,1,3,3,3-pentafluoro-2-trifluoromethylpropylmethylether (($CF_3)_2CHCF_2OCH_3$), 1,1,2,3,3,3-hexafluoropropylmethylether ($CF_3CHFCF_2OCH_3$), 1,1,2,3,3,3-hexafluoropropylethylether ($CF_3CHFCF_2OCH_2CH_3$), 2,2,3,4,4,4-hexafluorobutyldifluoromethylether ($CF_3CHFCF_2CH_2OCHF_2$), or a mixture thereof.

The hydrofluoroether may be included in an amount of about 10 to about 60 volume % based on the total volume of the solvent.

The first additive may be included in an amount of about 0.01 to about 1.5 wt % based on the total weight of the electrolyte solution.

When the additive includes the first additive and the second additive, the second additive may be included in an amount of about 0.05 to about 1.00 wt % based on the total weight of the electrolyte solution.

When the additive includes the first additive and the third additive, the third additive may be included in an amount of about 0.04 to about 1.00 wt % based on the total weight of the electrolyte solution.

When the additive includes the first additive and the fourth additive, the fourth additive may be included in an amount of about 0.01 to about 1.00 wt % based on the total weight of the electrolyte solution.

The first additive may include at least one selected from compounds represented by Chemical Formulae 1-1 to 1-9.

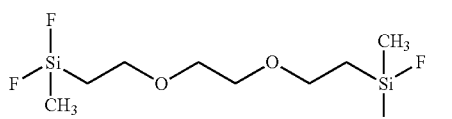

Chemical Formula 1-1

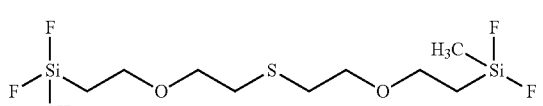

Chemical Formula 1-2

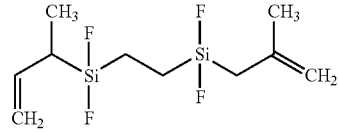

Chemical Formula 1-3

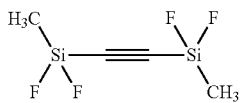

Chemical Formula 1-4

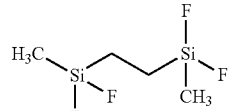

Chemical Formula 1-5

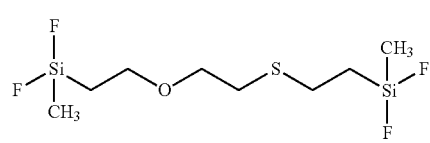

Chemical Formula 1-6

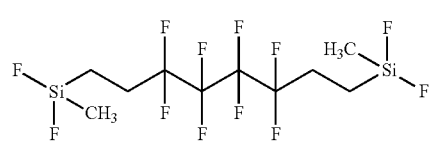

Chemical Formula 1-7

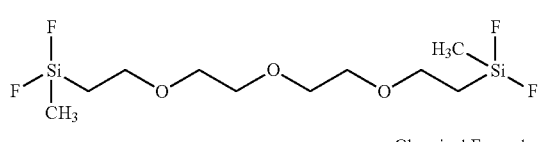

Chemical Formula 1-8

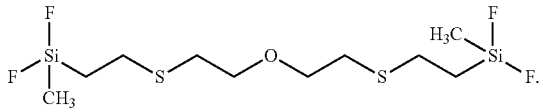

Chemical Formula 1-9

The second additive may include a compound represented by Chemical Formula 2-1, a compound represented by Chemical Formula 2-2, or a mixture thereof.

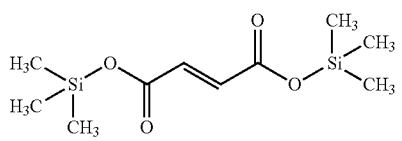

Chemical Formula 2-1

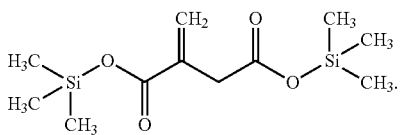

Chemical Formula 2-2

The third additive may include at least one selected from compounds represented by Chemical Formulae 3-1 to 3-8.

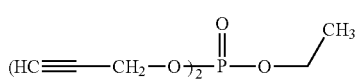

Chemical Formula 3-1

Chemical Formula 3-2

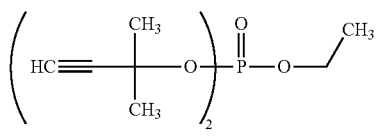

Chemical Formula 3-3

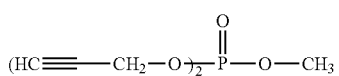

Chemical Formula 3-4

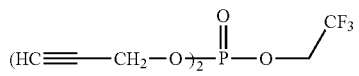

Chemical Formula 3-5

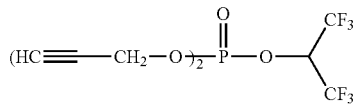

Chemical Formula 3-6

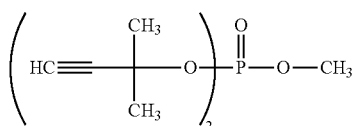

Chemical Formula 3-7

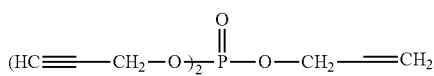

Chemical Formula 3-8

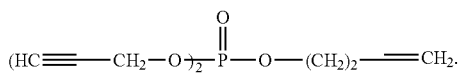

The fourth additive may include at least one selected from compounds represented by Chemical Formulae 4-1 to 4-4.

Chemical Formula 4-1

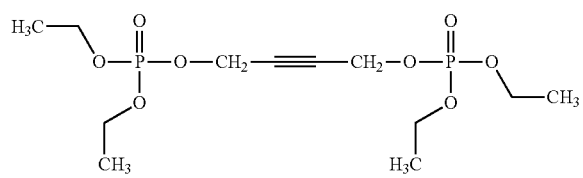

Chemical Formula 4-2

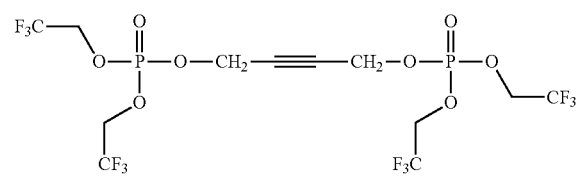

Chemical Formula 4-3

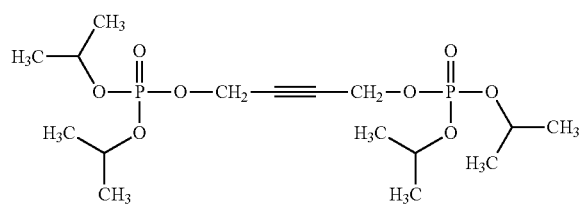

Chemical Formula 4-4

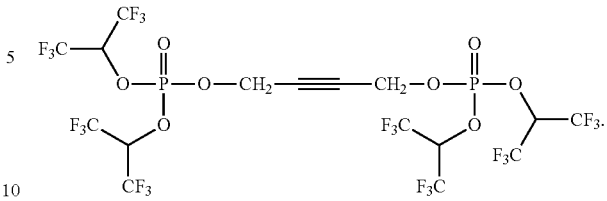

The lithium-containing transition metal oxide may be lithium cobalt-based composite oxide.

The rechargeable lithium battery may further include a negative electrode including a negative active material, wherein the negative active material includes at least one selected from a carbon-based material, a silicon-based material, a tin-based material, a lithium metal oxide, and a metal lithium.

The solvent may further include fluoroethylene carbonate.

The fluoroethylene carbonate may be included in an amount of about 10 to about 30 volume % based on the total volume of the solvent.

An oxidation-reduction potential of the rechargeable lithium battery may be greater than or equal to about 4.3 V (vs. Li/Li$^+$) and less than or equal to about 5.0 V.

Other embodiments of the present disclosure are included in the following detailed description.

A rechargeable lithium battery having improved cycle-life characteristics and storage characteristics at a high temperature may be realized.

DETAILED DESCRIPTION

Hereinafter, embodiments of the present disclosure are described in more detail. However, these example embodiments are provided for purposes of illustration, and this disclosure is not limited thereto.

As used herein, unless the context indicates otherwise, it will be understood that when an element such as a layer, film, region, or substrate is referred to as being "on" another element, it can be directly on the other element or intervening elements may also be present.

Hereinafter, a rechargeable lithium battery according to one or more embodiments of the present disclosure is described referring to FIG. 1.

Figure 1:
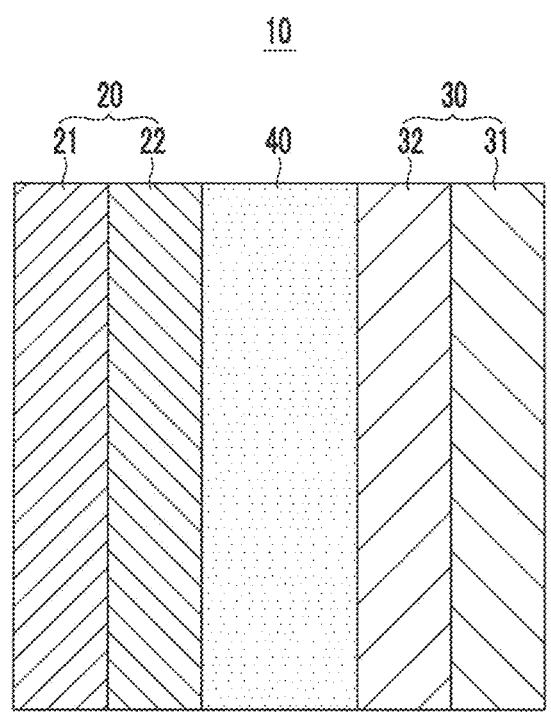
FIG. 1 is a cross-sectional view showing a rechargeable lithium battery according to one or more embodiments of the present disclosure.

FIG. 1 is a cross-sectional view showing a rechargeable lithium battery according to one or more embodiments of the present disclosure.

Referring to FIG. 1, a rechargeable lithium battery 10 includes a positive electrode 20, a negative electrode 30, and a separator layer 40.

The rechargeable lithium battery 10 may have a charge-reaching voltage (e.g., an oxidation reduction potential) of, for example, greater than or equal to about 4.3 V (vs. Li/Li$^+$)

and less than or equal to about 5.0 V, and in some embodiments, greater than or equal to about 4.4 V and less than or equal to about 5.0 V.

The shape of the rechargeable lithium ion battery 10 is not particularly limited, and the battery may have any suitable shape such as a shape of a cylinder, a prism laminate-type (e.g., a prism laminate), a button, and/or the like.

The positive electrode 20 includes a current collector 21 and a positive active material layer 22.

The current collector 21 may be any suitable conductor (e.g., any suitable material having electrically conductive properties), and may include, for example, aluminum, stainless steel, and/or nickel plated steel.

The positive active material layer 22 includes a positive active material, and may further include a conductive material, and a binder.

The positive active material according to one embodiment may include a lithium-containing transition metal oxide.

The lithium-containing transition metal oxide may be a lithium cobalt-based composite oxide such as $LiCoO_2$, a lithium nickel cobalt manganese-based composite oxide such as $LiNi_xCo_yMn_zO_2$, a lithium nickel-based composite oxide such as $LiNiO_2$, or a lithium manganese-based composite oxide such as $LiMn_2O_4$. The positive active material may include one of the aforementioned materials or a mixture of two or more. According to embodiments of the present disclosure, when a combination of the electrolyte solution additives (described later in more detail) is used as the electrolyte solution, deterioration of battery cycle-life characteristics and storage characteristics at high temperature due to using the lithium cobalt-based composite oxide may be prevented or reduced.

A content of the positive active material (e.g., the amount of the positive active material included in a positive active material layer of a rechargeable lithium battery) is not particularly limited, and the positive active material may be included in any suitable amount.

The conductive material may be, for example, carbon black such as ketjen black, acetylene black, and/or the like; natural graphite; artificial graphite; and/or the like, but the conductive material is not so limited and may include any suitable material capable of improving the conductivity of a positive electrode.

A content of the conductive material (e.g., the amount of the conductive material included in a positive active material layer of a rechargeable lithium battery) is not particularly limited, and the conductive material may be included in any suitable amount.

The binder may be, for example, polyvinylidene fluoride, an ethylene-propylene-diene terpolymer, a styrene-butadiene rubber (SBR), an acrylonitrile-butadiene rubber, a fluoroelastomer, polyvinyl acetate, poly(methyl methacrylate), polyethylene, nitrocellulose, and/or the like, but the binder is not so limited and may include any suitable binder so long as it can bind the positive active material and the conductive material on a current collector, and can exhibit oxidation resistance and electrolyte solution stability sufficient to endure a high potential of a positive electrode.

A content of the binder (e.g., the amount of the binder included in a positive active material layer of a rechargeable lithium battery) is not particularly limited, and the binder may be included in any suitable amount.

A density of the positive active material layer 22 is not particularly limited. The density of the positive active material layer 22 may be calculated by dividing surface density of the positive active material layer 22 after compression by a thickness of the positive active material layer 22 after compression.

The positive active material layer 22 may be manufactured by using, for example, the following method. For example, a positive electrode material mix is manufactured by dry-mixing the positive active material, the conductive agent, and the binder. Subsequently, the positive electrode material mix is dispersed in an appropriate or suitable organic solvent such as, for example, N-methyl-2-pyrrolidone to form a positive electrode material mix slurry, and the positive electrode material mix slurry is coated on a current collector 21, dried, and compressed to form a positive active material layer.

The negative electrode 30 includes a current collector 31 and a negative active material layer 32.

The current collector 31 may be any conductor (e.g., any suitable material having electrically conductive properties), and may include, for example, copper (Cu), a copper alloy, aluminum, stainless steel, nickel plated steel, and/or the like.

The negative active material layer 32 may be any negative active material layer suitable for use in a rechargeable lithium battery. For example, the negative active material layer 32 may include a negative active material, and may further include a binder.

The negative active material may include a carbon-based material, a silicon-based material, a tin-based material, a lithium metal oxide, and/or the like, which may be used singularly (e.g. individually) or in a mixture of two or more. The carbon-based material may be, for example, a graphite-based material such as artificial graphite, natural graphite, a mixture of artificial graphite and natural graphite, natural graphite coated with artificial graphite, and/or the like. The silicon-based material may be, for example, silicon, a silicon oxide, a silicon-containing alloy, a mixture of any of the foregoing materials and the graphite-based material, and/or the like. The silicon oxide may be represented by SiOx (where 0<x≤2). The tin-based material may be, for example, tin, a tin oxide, a tin-containing alloy, a mixture of any of the foregoing materials and a graphite-based material, and/or the like. The lithium metal oxide may be, for example, a titanium oxide-based compound such as $Li_4Ti_5O_{12}$.

For example, the negative active material may be a mixture of a carbon-based material such as a graphite-based material and a silicon-based material such as a silicon-containing alloy. The carbon-based material and silicon-based material may be mixed in a weight ratio of about 50:50 to about 90:10, for example, about 60:40 to about 80:20. A silicon content of the silicon-containing alloy (e.g., the amount of silicon included in the silicon-containing alloy) may be greater than or equal to about 50 wt % based on the total amount of the silicon-containing alloy. According to one embodiment, when the negative active material includes a silicon-based material, battery cycle-life characteristics and storage characteristics at a high temperature may be remarkably improved, as compared with those of a battery without the silicon-based material.

The description of the binder may be the same as that of the binder of the positive active material layer 22.

A content of the binder (e.g., the amount of the binder included in a negative active material layer of a rechargeable lithium battery) is not particularly limited, and the binder may be included in any suitable amount.

The negative active material layer 32 may further include a thickener such as carboxymethyl cellulose (CMC). A weight ratio of the thickener to the binder may be greater than or equal to about 1/10 and less than or equal to about 10/10.

A density of the negative active material layer 32 is not particularly limited. The density of the negative active material layer 32 may be calculated by dividing surface density of the negative active material layer 32 after compression by a thickness of the negative active material layer 32 after compression.

The negative electrode 30 may be manufactured by using, for example, the following method. First, a negative active material and a binder are dispersed in a solvent such as water and N-methyl-pyrrolidone to prepare a slurry, followed by coating the slurry on a current collector 31 and drying the same.

The separator layer 40 includes a separator and an electrolyte solution.

The separator is not particularly limited, and may be any separator suitable for use in a rechargeable lithium battery.

The separator may include a porous layer, a non-woven fabric having excellent high-rate discharge performance, or a mixture thereof.

The separator may be made of a material including, for example, a polyolefin-based resin, a polyester-based resin, polyvinylidene fluoride (PVDF), a vinylidene fluoride-hexafluoropropylene copolymer, a vinylidene fluoride-perfluorovinylether copolymer, a vinylidene fluoride-tetrafluoroethylene copolymer, a vinylidene fluoride-trifluoroethylene copolymer, a vinylidene fluoride-fluoroethylene copolymer, a vinylidene fluoride-hexafluoroacetone copolymer, a vinylidene fluoride-ethylene copolymer, a vinylidene fluoride-propylene copolymer, a vinylidene fluoride-trifluoropropylene copolymer, a vinylidene fluoride-tetrafluoroethylene-hexafluoropropylene copolymer, a vinylidene fluoride-ethylene-tetrafluoroethylene copolymer, and/or the like. The polyolefin-based resin may be, for example, polyethylene, polypropylene, and/or the like, and the polyester-based resin may be, for example, polyethylene terephthalate, polybutylene terephthalate, and/or the like.

A thickness of the separator is not particularly limited.

The electrolyte solution may include a lithium salt, a solvent, and an additive.

The lithium salt may function as an electrolyte of the electrolyte solution. The lithium salt may be, for example, $LiPF_6$, $LiClO_4$, $LiBF_4$, $LiAsF_6$, $LiSbF_6$, $LiSO_3CF_3$, $LiN(SO_2CF_3)$, $LiN(SO_2CF_2CF_3)$, $LiC(SO_2CF_2CF_3)_3$, $LiC(SO_2CF_3)_3$, LiI, LiCl, LiF, $LiPF_5(SO_2CF_3)$, $LiPF_4(SO_2CF_3)_2$, and/or the like. One or more lithium salts may be dissolved in the electrolyte solution.

In some embodiments, the lithium salt dissolved in the electrolyte solution improves battery characteristics.

A concentration of the lithium salt is not particularly limited, but may be about 0.85 to about 1.6 mol/L, for example, about 0.9 to about 1.40 mol/L. When the concentration of the lithium salt is within any of these ranges, battery characteristics may be improved.

According to one embodiment of the present disclosure, a solvent may include hydrofluoroether (HFE).

Herein, the hydrofluoroether (HFE) may refer to an ether in which one or more hydrogen atoms have been substituted with fluorine, and the HFE may be used to improve oxidation resistance.

The hydrofluoroether (HFE) may be selected from 2,2,2-trifluoroethylmethylether ($CF_3CH_2OCH_3$), 2,2,2-trifluoroethyldifluoromethylether ($CF_3CH_2OCHF_2$), 2,2,3,3,3-pentafluoropropylmethylether ($CF_3CF_2CH_2OCH_3$), 2,2,3,3,3-pentafluoropropyldifluoromethylether ($CF_3CF_2CH_2OCHF_2$), 2,2,3,3,3-pentafluoropropyl-1,1,2,2-tetrafluoroethylether ($CF_3CF_2CH_2OCF_2CF_2H$), 1,1,2,2-tetrafluoroethylmethylether ($HCF_2CF_2OCH_3$), 1,1,2,2-tetrafluoroethylethylether ($HCF_2CF_2OCH_2CH_3$), 1,1,2,2-tetrafluoroethylpropylether ($HCF_2CF_2OC_3H_7$), 1,1,2,2-tetrafluoroethylbutylether ($HCF_2CF_2OC_4H_9$), 2,2,3,3-tetrafluoroethyldifluoromethylether ($H(CF_2)_2CH_2O(CF_2)H$), 1,1,2,2-tetrafluoroethylisobutylether ($HCF_2CF_2OCH_2CH(CH_3)_2$), 1,1,2,2-tetrafluoroethylisopentylether ($HCF_2CF_2OCH_2C(CH_3)_3$), 1,1,2,2-tetrafluoroethyl-2,2,2-trifluoroethylether ($HCF_2CF_2OCH_2CF_3$), 1,1,2,2-tetrafluoroethyl-2,2,3,3-tetrafluoropropylether ($HCF_2CF_2OCH_2CF_2CF_2H$), hexafluoroisopropylmethylether (($CF_3$)$_2CHOCH_3$), 1,1,3,3,3-pentafluoro-2-trifluoromethylpropylmethylether (($CF_3$)$_2CHCF_2OCH_3$), 1,1,2,3,3,3-hexafluoropropylmethylether ($CF_3CHFCF_2OCH_3$), 1,1,2,3,3,3-hexafluoropropylethylether ($CF_3CHFCF_2OCH_2CH_3$), 2,2,3,4,4,4-hexafluorobutyldifluoromethylether ($CF_3CHFCF_2CH_2OCHF_2$), and mixtures thereof, depending on the charge voltage (e.g., charging voltage) and resistance for a current density of a positive electrode material. For example, the HFE may be selected in consideration of the charging voltage of a battery and the resistance of the positive electrode material (at a given or set current density of the battery) Any of the aforementioned materials may be used singularly (e.g., individually) or in a mixture of two or more.

A content (e.g., amount) of the hydrofluoroether is not particularly limited, and may be about 10 to about 60 volume %, for example, about 30 to about 50 volume %, or about 35 to about 50 volume %, based on the total volume of the solvent. When the content of the hydrofluoroether is within any of these ranges, battery characteristics may be improved.

In addition to the hydrofluoroether, the solvent may further include a non-aqueous solvent, which may be any non-aqueous solvent suitable for use in a rechargeable lithium battery, without particular limitation.

The non-aqueous solvent may be selected from, for example, cyclic carbonate esters such as propylene carbonate, ethylene carbonate, butylene carbonate, chloroethylene carbonate, vinylene carbonate, and/or the like; linear carbonates such as dimethyl carbonate, diethyl carbonate, ethylmethyl carbonate, and/or the like; cyclic esters such as γ-butyrolactone, γ-valerolactone, and/or the like; linear esters such as methyl formate, methyl acetate, butyric acid methyl ester, and/or the like; tetrahydrofuran and derivatives thereof; ethers such as 1,3-dioxane, 1,4-dioxane, 1,2-dimethoxy ethane, 1,4-dibutoxyethane, methyl diglyme, and/or the like; nitriles such as acetonitrile, benzonitrile, and/or the like; dioxolane and derivatives thereof; and ethylene sulfide, sulfolane, sultone, and derivatives thereof, which may be used singularly (e.g., individually) or as a mixture of two or more, without limitation. When two or more non-aqueous solvents are used, a mixing ratio of the two or more solvents is not particularly limited and may be any ratio suitable for a rechargeable lithium battery. In some embodiments, one or more linear carbonates may be used as the non-aqueous solvent.

A content (e.g., amount) of the linear carbonate(s) may be about 5 to about 60 volume %, for example, about 20 to about 50 volume %, based on the total volume of the solvent. When the content of the linear carbonates is within any of these ranges, battery characteristics may be improved.

The solvent may further include fluoroethylene carbonate.

A content (e.g., amount) of the fluoroethylene carbonate may be about 10 to about 30 volume %, for example, about 15 to about 20 volume %, based on the total volume of the solvent. When the content of the fluoroethylene carbonate is within any of these ranges, cycle-life characteristics may be improved.

The additive may include a first additive represented by Chemical Formula 1, and may further include at least one selected from a second additive represented by Chemical Formula 2, a third additive represented by Chemical Formula 3, and a fourth additive represented by Chemical Formula 4. In some embodiments, the additive includes a first additive represented by Chemical Formula 1, and further includes at least one selected from a second additive represented by Chemical Formula 2, a third additive represented by Chemical Formula 3, and a fourth additive represented by Chemical Formula 4.

Hereinafter, each of the first to fourth additives will be described.

First Additive

The first additive may be a disilane compound represented by Chemical Formula 1. The first additive may be used singularly or in a mixture of two or more (e.g., only one compound represented by Chemical Formula 1 may be used or a mixture of two or more different compounds each represented by Chemical Formula 1 may be used).

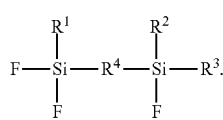

Chemical Formula 1

In Chemical Formula 1, $R^1$ to $R^3$ may be each independently selected from a C1 to C8 alkyl group substituted or unsubstituted with 'a vinyl group or a C1 to C5 alkyl group' and not including a double bond, a C1 to C8 alkyl group substituted or unsubstituted with 'a vinyl group or a C1 to C5 alkyl group' and including a double bond, a C2 to C8 alkenyl group, a C5 to C8 cycloalkyl group, a C6 to C8 aryl group, and a fluorine atom. For example, the C1 to C8 alkyl group may be an unsubstituted C1 to C8 alkyl group or a substituted C1 to C8 alkyl group having a vinyl group or a C1 to C5 alkyl group, where the C1 to C8 alkyl group does not include a double bond (other than the optional vinyl group). In some embodiments, the C1 to C8 alkyl group may be an unsubstituted C1 to C8 alkyl group or a substituted C1 to C8 alkyl group having a vinyl group or a C1 to C5 alkyl group, where the C1 to C8 alkyl is a C2 to C8 alkyl group including a double bond (in addition to the optional vinyl group). The C1 to C8 alkyl group may be, for example, a methyl group, an ethyl group, a propyl group, an isopropyl group, a butyl group, an isobutyl group, a secondary butyl group, a t-butyl group, a pentyl group, an isopentyl group, a secondary pentyl group, a t-pentyl group, a hexyl group, a secondary hexyl group, a heptyl group, a secondary heptyl group, an octyl group, a secondary octyl group, a 2-methyl pentyl group, a 2-ethyl hexyl group, and/or the like. The C2 to C8 alkenyl group may be, for example, a 1,3-butadienyl group, a 1,2-propadienyl group, a 1,4-pentadienyl group, a vinyl group, a propenyl group, an isopropenyl group, a butenyl group, a pentenyl group, a hexenyl group, a 1-propene-2,3-diyl, an ethynyl group, a propynyl group, a butynyl group, a pentynyl group, a hexynyl group, and/or the like.

The C5 to C8 cycloalkyl group may be, for example, a cyclopentyl group, a cyclohexyl group, a cyclohexylmethyl group, and/or the like. The C6 to C8 aryl group may be, for example, a phenyl group, a tolyl group, a xylyl group, and/or the like. The aforementioned substituents may be each independently substituted with a halogen atom, a vinyl group, a C1 to C5 alkyl group, and/or the like. For example, the C1 to C8 alkyl group may include a double bond or may not include a double bond.

The C1 to C8 alkyl group including a double bond, for example a propyl group including a double bond, may be represented by Chemical Formula A, where * represents a binding site to a neighboring atom.

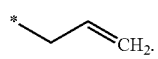

Chemical Formula A

In Chemical Formula 1, $R^4$ may be selected from a C1 to C8 alkylene group, a C2 to C8 alkynylene group, a C4 to C8 alkylene group having at least one selected from an ether group and a thioether group, a C1 to C8 alkylene group having a plurality of $—CF_2—$ linking groups, and a C4 to C10 alkylene group having 'an ether group and a thioether group (e.g., sulfide group)'. The C1 to C8 alkylene group may or may not include at least one $—CF_2—$ linking group. For example, $R^4$ may be a C5 to C8 alkylene group having four $—CF_2—$ linking groups as represented by Chemical Formulae B to E.

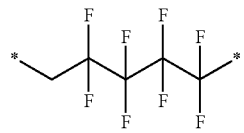

Chemical Formula B

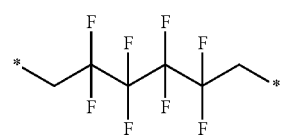

Chemical Formula C

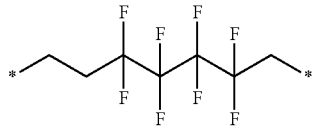

Chemical Formula D

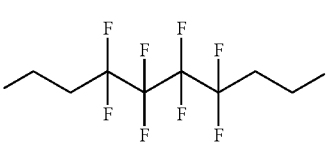

Chemical Formula E

The C1 to C8 alkylene group may be, for example, a methylene group, an ethylene group, a propylene group, a butylene group, a pentamethylene group, a hexamethylene group, a heptamethylene group, an octamethylene group, a 2-methylbutylene group, and/or the like. The C2 to C8 alkynylene group may be, for example, an ethynylene group, a propynylene group, a butynylene group, a pentenylene group, a hexynylene group, a heptynylene group, an octynylene group, a nonynylene group, an ethyne-1,2-diyl, and/or the like. The C4 to C8 alkylene group having at least one selected from an ether group and a thioether group may be, for example, a C4 to C8 alkylene group including at least one selected from an oxygen atom and a sulfur atom, for example, a thioether group. Non-limiting examples of the C4 to C8 alkylene group having at least one selected from an ether group and a thioether group include a 4-oxaheptylene group, a 5-oxanonylene group, and the like. The C4 to C10 alkylene group having an ether group and a thioether group (e.g., a sulfide group) may be a C4 to C10 alkylene group including an oxygen atom and a sulfur atom. The ether group may be represented by (e.g., may include) —O—, and the thioether group (e.g., sulfide group) may be represented by (e.g., may include) —S—. The aforementioned substituents may be each independently substituted with a halogen atom.

Non-limiting examples of the first additive include, 1,3-bis(difluoromethylsilyl)propane, 1,2-bis(difluoromethylsilyl)ethane, 1,2-bis(difluoroethylsilyl)ethane, 1-difluoromethylsilyl-2-difluoroethylsilylethane, 1-difluoromethylsilyl-2-difluoropropylsilylethane, 1,3,3-tetraethyldisiloxane, 1,3-difluoro-1,1,3,3-tetrapropyldisiloxane, 1,3-difluoro-1,1,3,3-tetrabutyldisiloxane, 1,3-difluoro-1,1,3,3-tetrapentyldisiloxane, 1,3-difluoro-1,1,3,3-tetrahexyldisiloxane, 1,2-bis(fluorodimethylsilyl)ethane, 1,2-bis(fluorodiethylsilyl)ethane, 1,2-bis(fluorodipropylsilyl)ethane, 1,2-bis(fluorodibutylsilyl)ethane, 1-fluorodimethylsilyl-2-fluoroethylsilylethane, 1,3-bis(fluorodimethylsilyl)propane, 1,3-bis(fluorodiethylsilyl)propane, 1,3-bis(fluorodipropylsilyl)propane, 1,3-bis(fluorodibutylsilyl)propane, 1,3-divinyl-1,1,3,3-tetraethyldisiloxane, 1,3-divinyl-1,1,3,3-tetrapropyldisiloxane, 1,3-divinyl-1,1,3,3-tetrabutyldisiloxane, 1,3-divinyl-1,1,3,3-tetrapentyldisiloxane, 1,3-divinyl-1,1,3,3-tetrahexyldisiloxane, 1,3-diethynyl-1,1,3,3-tetramethyldisiloxane, 1,3-diethynyl-1,1,3,3-tetraethyldisiloxane, 1,3-diethynyl-1,1,3,3-tetrapropyldisiloxane, 1,3-diethynyl-1,1,3,3-tetrapentyldisiloxane, and the like.

In some embodiments, the first additive may include at least one selected from disilane compounds represented by Chemical Formulae 1-1 to 1-9, and in some embodiments, at least one selected from disilane compounds represented by Chemical Formulae 1-1 to 1-4.

Chemical Formula 1-1

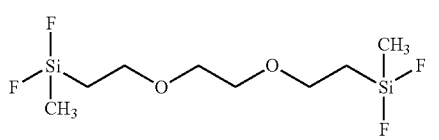

Chemical Formula 1-2

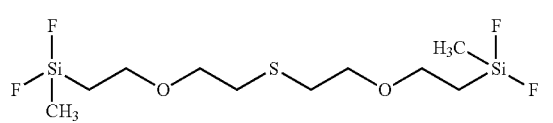

Chemical Formula 1-3

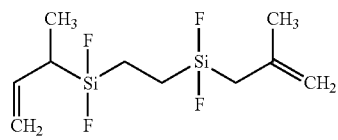

Chemical Formula 1-4

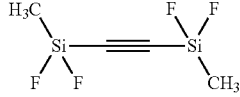

Chemical Formula 1-5

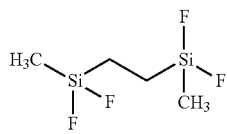

Chemical Formula 1-6

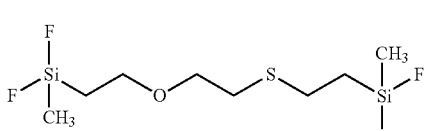

Chemical Formula 1-7

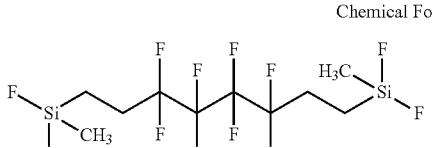

Chemical Formula 1-8

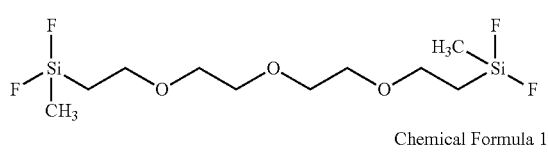

Chemical Formula 1-9

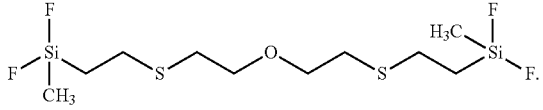

Second Additive

The second additive may be a disilane compound represented by Chemical Formula 2. The second additive may be used singularly or in a mixture of two or more (e.g., only one compound represented by Chemical Formula 2 may be used or a mixture of two or more different compounds each represented by Chemical Formula 2 may be used).

Chemical Formula 2

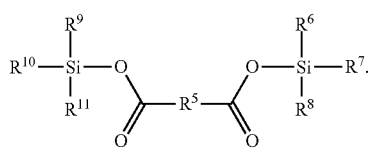

In Chemical Formula 2, $R^5$ may be selected from a C2 to C6 alkylene group without a double bond, a C2 to C6 alkylene group with a double bond, and a C6 to C12 arylene group. The C2 to C6 alkylene group may be, for example, an ethylene group, a propylene group, a butylene group, a pentamethylene group, a hexamethylene group, and/or the like. The C2 to C6 alkylene group may include a double bond. For example, a C3 alkylene group having one double bond may be represented by Chemical Formula F.

Chemical Formula F

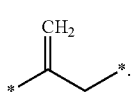

The C6 to C12 arylene group may be, for example, 1,2-phenylene group, 1,4-phenylene group, (1,1'-biphenyl)-4,4'-diyl group, and/or the like. The aforementioned substituents may be each independently substituted with a halogen atom.

In Chemical Formula 2, $R^6$ to $R^{11}$ may be each independently selected from a C1 to C6 alkyl group and a C2 to C6 alkenyl group. The C1 to C6 alkyl group may be, for example, a methyl group, an ethyl group, a propyl group, an isopropyl group, a butyl group, a pentyl group, a 2-propynyl group, a 3-fluoropropyl group, a 3-fluorobutyl group, a 4-fluorobutyl group, and/or the like. The C2 to C6 alkenyl group may be, for example, a 1,3-butadienyl group, a 1,2-propadienyl group, 1,4-pentadienyl group, a vinyl group, a propenyl group, an isopropenyl group, a butenyl group, a pentenyl group, a hexenyl group, and/or the like. The aforementioned substituents may be each independently substituted with a halogen atom.

Non-limiting examples of the second additive may include bis(trimethylsilyl)acetylene dicarboxylate, bis(ethyldimethylsilyl)acetylene dicarboxylate, bis(dimethylpropylsilyl)acetylene dicarboxylate, bis(dimethylbutylsilyl) acetylene dicarboxylate, bis(dimethylvinylsilyl)acetylene dicarboxylate, fumaric acid bis(trimethylsilyl), maleic acid bis(trimethylsilyl), phthalic acid bis(trimethylsilyl), isophthalic acid bis(trimethylsilyl), terephthalic acid bis (trimethylsilyl), itaconic acid bis(trimethylsilyl), and the like.

The second additive may include, for example, a compound represented by Chemical Formula 2-1, a compound represented by Chemical Formula 2-2, or a mixture thereof.

Chemical Formula 2-1

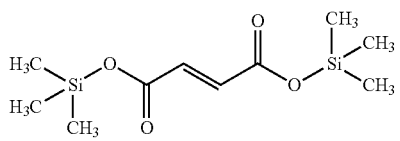

Chemical Formula 2-2

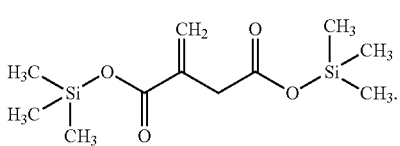

Third Additive

The third additive may be an unsaturated phosphoric acid ester compound represented by Chemical Formula 3. The third additive may be used singularly or in a mixture of two or more (e.g., only one compound represented by Chemical Formula 3 may be used or a mixture of two or more different compounds each represented by Chemical Formula 3 may be used).

Chemical Formula 3

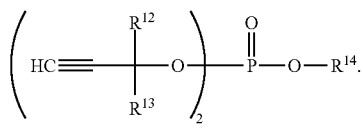

In Chemical Formula 3, $R^{12}$ and $R^{13}$ may each independently be selected from hydrogen and a C1 to C8 alkyl group. The C1 to C8 alkyl group may be a methyl group, an ethyl group, a propyl group, an isopropyl group, a butyl group, an isobutyl group, a secondary butyl group, a t-butyl group, a pentyl group, an isopentyl group, a secondary pentyl group, a t-pentyl group, a hexyl group, a secondary hexyl group, a heptyl group, a secondary heptyl group, an octyl group, a secondary octyl group, a 2-methyl pentyl group, a 2-ethyl hexyl group, and/or the like. In some embodiments, $R^{12}$ and $R^{13}$ may be selected from hydrogen, methyl group, ethyl group, and propyl group, and in some embodiments, selected from hydrogen and methyl group, and in some embodiments, $R^{12}$ and $R^{13}$ may each be hydrogen. When $R^{12}$ and $R^{13}$ are selected from the aforementioned groups (e.g., $R^{12}$ and $R^{13}$ are both hydrogen), unfavorable effect on movement of lithium ions may be prevented or reduced, and good charge characteristics may be obtained.

In Chemical Formula 3, $R^{14}$ may be selected from a C1 to C8 alkyl group substituted or unsubstituted with a vinyl group, a C2 to C8 alkenyl group, a C2 to C8 alkynyl group, and a C1 to C8 halogenated alkyl group. Examples of the C1 to C8 alkyl group and the C2 to C8 alkenyl group may be respectively the same as those provided herein in connection with $R^1$ to $R^3$ in Chemical Formula 1. Non-limiting examples of the C2 to C8 alkynyl group may include an ethynyl group, a 2-propynyl group (herein, also referred to as "propargyl"), a 3-butynyl group, a 1-methyl-2-propynyl group, a 1,1-dimethyl-2-propynyl group, and the like. Non-limiting examples of the C1 to C8 halogenated alkyl group may include a chloromethyl group, a trifluoromethyl group, a 2-fluoroethyl group, a 2-chloroethyl group, a 2,2,2-trifluoroethyl group, a 2,2,2-trichloroethyl group, a 1,1,2,2-tetrafluoroethyl group, a pentafluoroethyl group, a 3-fluoropropyl group, a 2-chloropropyl group, a 3-chloropropyl group, a 2-chloro-2-propyl group, a 3,3,3-trifluoropropyl group, a 2,2,3,3-tetrafluoropropyl group, a heptafluoropropyl group, a 2-chlorobutyl group, a 3-chlorobutyl group, a 4-chlorobutyl group, a 3-chloro-2-butyl group, a 1-chloro-2-butyl group, a 2-chloro-1,1-dimethylethyl group, a 3-chloro-2-methylpropyl group, a 5-chloropentyl group, a 3-chloro-2-methylpropyl group, a 3-chloro-2,2-dimethyl group, a 6-chlorohexyl group, and the like. In some embodiments, $R^{14}$ may be selected from the methyl group, ethyl group, propyl group, isopropyl group, butyl group, pentyl group, 2-propynyl group, 3-chloropropyl group, 3-chlorobutyl group, and 4-chlorobutyl group, and in some embodiments, from the methyl group, ethyl group, propyl group, and 2-propynyl group, and in some embodiments, from the ethyl group and 2-propynyl group. When $R^{14}$ is selected from any of the aforementioned groups, internal resistance of a rechargeable lithium battery may decrease.

Non-limiting examples of the third additive where $R^{12}$ and $R^{13}$ are both the hydrogen atom may include methyl bis(2-propynyl)phosphate, ethyl bis(2-propynyl)phosphate, propyl bis(2-propynyl)phosphate, butyl bis(2-propynyl) phosphate, pentyl bis(2-propynyl)phosphate, allyl bis(2-propynyl)phosphate, tris(2-propynyl)phosphate, 2-chloroethyl bis(2-propynyl)phosphate, 2,2,2-trifluoroethyl bis(2-propynyl)phosphate, 2,2,2-trichloroethyl bis(2-propynyl)phosphate, and the like.

Non-limiting examples of the third additive where $R^{12}$ is the methyl group and $R^{13}$ is the hydrogen atom may include methyl bis(1-methyl-2-propynyl)phosphate, ethyl bis(1-methyl-2-propynyl)phosphate, propyl bis(1-methyl-2-propyl)phosphate, butyl bis(1-methyl-2-propynyl)phosphate, pentyl bis(1-methyl-2-propynyl)phosphate, allyl bis(1-methyl-2-propynyl)phosphate, 2-propynyl bis(1-methyl-2-propynyl)phosphate, tris(1-methyl-1-methyl-2-propynyl) phosphate, 2-chloroethyl bis(1-methyl-2-propynyl) phosphate, 2,2,2-trifluoroethyl bis(1-methyl-2-propynyl) phosphate, 2,2,2-trichloroethyl bis(1-methyl-2-propynyl) phosphate, and the like.

Non-limiting examples of the third additive where $R^{12}$ and $R^{13}$ are both the methyl group may include methyl bis(1,1-dimethyl-2-propynyl)phosphate, ethyl bis(1,1-dimethyl-2-propynyl)phosphate, propyl bis(1,1-dimethyl-2-propynyl)phosphate, butyl bis(1,1-dimethyl-2-propynyl)phosphate, pentyl bis(1,1-dimethyl-2-propynyl)phosphate, allyl bis(1,1-dimethyl-2-propynyl)phosphate, 2-propynyl bis(1,1-dimethyl-2-propynyl)phosphate, tris(1,1-dimethyl-2-propynyl)phosphate, 2-chloroethyl bis(1,1-dimethyl-2-propynyl)phosphate, 2,2,2-trifluoroethyl bis(1,1-dimethyl-2-propynyl)phosphate, 2,2,2-trichloroethyl bis(1,1-dimethyl-2-propynyl)phosphate, and the like.

In some embodiments, the third additive may be selected from methyl bis(2-propynyl)phosphate, ethyl bis(2-propynyl)phosphate, propyl bis(2-propynyl)phosphate, butyl bis(2-propynyl)phosphate, pentyl bis(2-propynyl)phosphate, tris(2-propynyl)phosphate, and 2-chloroethyl bis(2-propynyl)phosphate, and in some embodiments, from ethyl bis(2-propynyl)phosphate, propyl bis(2-propynyl)phosphate, butyl bis(2-propynyl)phosphate, and tris(2-propynyl)phosphate, and in some embodiments, from ethyl bis(2-propynyl)phosphate and tris(2-propynyl)phosphate.

The third additive may include, for example, at least one of unsaturated phosphoric acid ester compounds represented by Chemical Formulae 3-1 to 3-8. For example, the third additive may include an unsaturated phosphoric acid ester compound represented by Chemical Formula 3-1, an unsaturated phosphoric acid ester compound represented by Chemical Formula 3-2, or a mixture thereof.

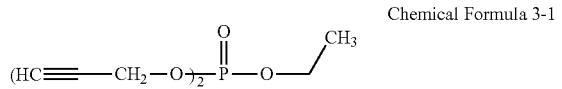

Chemical Formula 3-1

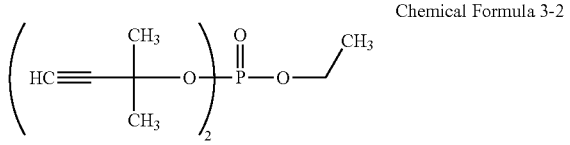

Chemical Formula 3-2

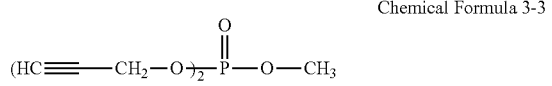

Chemical Formula 3-3

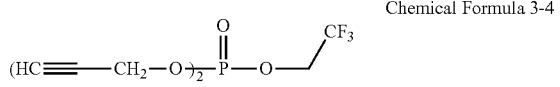

Chemical Formula 3-4

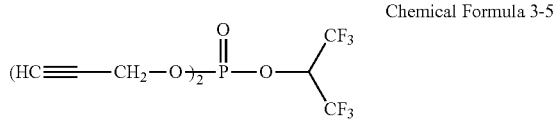

Chemical Formula 3-5

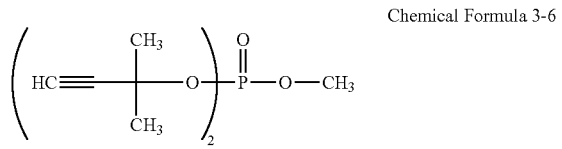

Chemical Formula 3-6

Chemical Formula 3-7

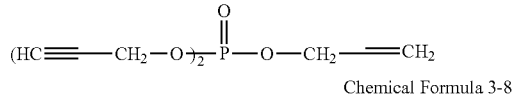

Chemical Formula 3-8

Fourth Additive

The fourth additive may be an unsaturated phosphoric acid ester compound represented by Chemical Formula 4.

The fourth additive may be used singularly or in a mixture of two or more (e.g., only one compound represented by Chemical Formula 4 may be used or a mixture of two or more different compounds each represented by Chemical Formula 4 may be used).

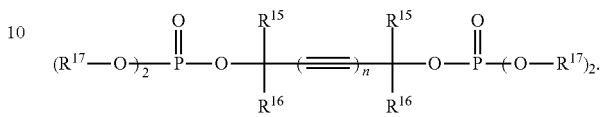

Chemical Formula 4

In Chemical Formula 4, $R^{15}$ and $R^{16}$ may be independently selected from hydrogen and a C1 to C8 alkyl group. Examples of the C1 to C8 alkyl group may be the same as those provided herein in connection with $R^1$ to $R^3$ in Chemical Formula 1. In some embodiments, $R^{15}$ and $R^{16}$ may be independently selected from the hydrogen, methyl group, ethyl group, and propyl group, and in some embodiments, selected from the hydrogen and methyl group, and in some embodiments, $R^{15}$ and $R^{16}$ may each be the hydrogen. When $R^{15}$ and $R^{16}$ are selected from the aforementioned groups (e.g., $R^{15}$ and $R^{16}$ are both hydrogen), unfavorable effect on movement of lithium ions may be prevented or reduced, and good charge characteristics may be obtained.

In Chemical Formula 4, $R^{17}$ may be selected from a C1 to C8 alkyl group, a C2 to C8 alkenyl group, a C2 to C8 alkynyl group, and a C1 to C8 halogenated alkyl group. Examples of the C1 to C8 alkyl group and the C2 to C8 alkenyl group may be respectively the same as those provided herein in connection with $R^1$ to $R^3$ in Chemical Formula 1. Examples of the C2 to C8 alkynyl group and the C1 to C8 halogenated alkyl group may be respectively the same as those provided herein in connection with $R^{14}$ in Chemical Formula 3. In some embodiments, $R^{17}$ may be selected from the methyl group, ethyl group, propyl group, isopropyl group, butyl group, pentyl group, 2-propynyl group, 3-chloropropyl group, 3-chlorobutyl group, and 4-chlorobutyl group, and in some embodiments, from the methyl group, ethyl group, propyl group, and 2-propynyl group, and in some embodiments, from the methyl group and ethyl group. When $R^{17}$ is selected from the aforementioned groups, internal resistance of a rechargeable lithium battery may decrease.

In Chemical Formula 4, n may be 1 or 2. When n is 1 or 2, a phosphoric acid ester reaction from alkyne dials as a raw material may be easily performed at a high yield rate. When n is 2, the relevant portion of Chemical Formula 4 (e.g., the portion of Chemical Formula 4 represented by

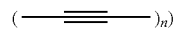

may be represented by Chemical Formula G.

Chemical Formula G

Non-limiting examples of the fourth additive where n is 1 may include 2-butyne-1,4-diol tetramethyl diphosphate, 2-butyne-1,4-diol tetraethyl diphosphate, 2-butyne-1,4-diol tetrapropyl diphosphate, 2-butyne-1,4-diol tetraisopropyl diphosphate, 2-butyne-1,4-diol tetrabutyl diphosphate, 2-butyne-1,4-diol tetrapentyl diphosphate, 2-butyne-1,4-diol tetrakis (2-propynyl)diphosphate, 2-butyne-1,4-diol tetrakis (3-chloropropyl) diphosphate, 2-butyne-1,4-diol tetrakis (3-chlorobutyl) diphosphate, 2-butyne-1,4-diol tetrakis (4-chlorobutyl) diphosphate, and the like. In some embodiments, the fourth additive may be selected from 2-butyne-1,4-diol tetramethyl diphosphate, 2-butyne-1,4-diol tetraethyl diphosphate, 2-butyne-1,4-diol tetrapropyl diphosphate, 2-butyne-1,4-diol tetrakis (2-propynyl) diphosphate, and the like, for example, from 2-butyne-1,4-diol tetramethyl diphosphate, 2-butyne-1,4-diol tetrakis (2-propynyl) diphosphate, and the like.

Non-limiting examples of the fourth additive where n is 2 may include 2,4-hexadiyne-1,6-diol tetramethyl diphosphate, 2,4-hexadiyne-1,6-diol tetraethyl diphosphate, 2,4-hexadiyne-1,6-diol tetrapropyl diphosphate, 2,4-hexadiyne-1,6-diol tetraisopropyl diphosphate, 2,4-hexadiyne-1,6-diol tetrabutyl diphosphate, 2,4-hexadiyne-1,6-diol tetrapentyl diphosphate, 2,4-hexadiyne-1,6-diol tetrakis (2-propynyl) diphosphate, 2,4-hexadiyne-1,6-diol tetrakis (3-chloropropyl) diphosphate, 2,4-hexadiyne-1,6-diol tetrakis (3-chlorobutyl) diphosphate, 2,4-hexadiyne-1,6-diol tetrakis (4-chlorobutyl) diphosphate, and the like. In some embodiments, the fourth additive may be selected from 2,4-hexadiyne-1,6-diol tetramethyl diphosphate, 2,4-hexadiyne-1,6-diol tetraethyl diphosphate, 2,4-hexadiyne-1,6-diol tetrapropyl diphosphate, 2,4-hexadiyne-1,6-diol tetrakis (2-propynyl) diphosphate, and the like, for example, from 2,4-hexadiyne-1,6-diol tetramethyl diphosphate, 2,4-hexadiyne-1,6-diol tetrakis (2-propynyl) diphosphate, and the like.

In some embodiments, the fourth additive may include, at least one of unsaturated phosphoric acid ester compounds represented by Chemical Formulae 4-1 to 4-4, for example, an unsaturated phosphoric acid ester compound represented by Chemical Formula 4-1, an unsaturated phosphoric acid ester compound represented by Chemical Formula 4-2, or a mixture thereof.

Chemical Formula 4-1

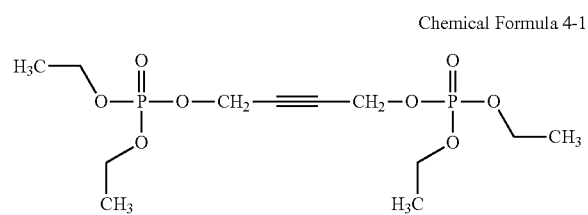

Chemical Formula 4-2

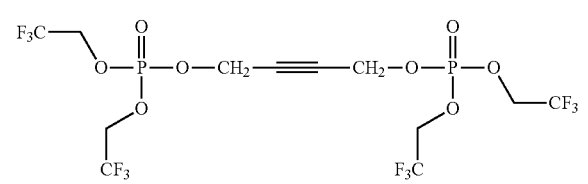

Chemical Formula 4-3

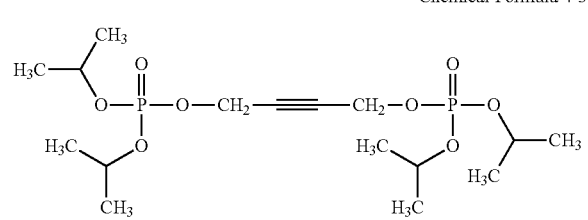

Chemical Formula 4-4

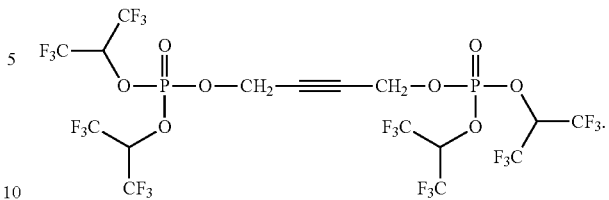

The electrolyte solution including the first additive and at least one selected from the second to fourth additives may improve battery cycle-life characteristics and storage characteristics at a high temperature. For example, the electrolyte solution may include the first additive and the second additive, the first additive and the third additive, or the first additive and the fourth additive. For example, the electrolyte solution may include the first additive, the second additive, and the third additive; the first additive, the second additive, and the fourth additive; or the first additive, the third additive, and the fourth additive. For example, the electrolyte solution may include the first additive, the second additive, the third additive, and the fourth additive.

The first to fourth additives according to embodiments of the present disclosure may be better decomposed in the electrolyte solution than hydrofluoroether (HFE), for example, at a lower potential than the solvent, or the additive adsorbs on the surface of the positive active material. The first to fourth additives or decomposed products thereof may cover the positive active material and may suppress or reduce the decomposition of the hydrofluoroether. For example, the first to fourth additives themselves (or decomposed products thereof) may cover the positive active material, thus suppressing or reducing the contact between the hydrofluoroether and the positive active material. Accordingly, the formation of a high-resistance passivation film on a positive active material (that may otherwise be derived (e.g., formed) from the solvent, particularly, from decomposed products of hydrofluoroether) may be suppressed or reduced, and deterioration of cycle characteristics of the battery and/or gas generation of the electrolyte solution (HFE) may be suppressed or reduced.

Additional effects of the first to fourth additives are described hereinafter in more detail.

A silyl group at a terminal end of the first additive may easily interact with hydrofluoric acid released in a part of a $LiPF_6$ electrolyte or an electrolyte solution, and thus the first additive may be decomposed earlier than the second to fourth additives at the association-dissociation point on a positive electrode and may form a passivation film. For example, the unsaturated group (e.g., alkynylene group and the like) between the two silyl groups in the first additive may contribute to the formation of a passivation film. Then, the second additive is decomposed, and the carbonyl group in the structure thereof endows the passivation film with ion conductivity. The third and fourth additives are more chemically stable than the first and second additives, and have voltage-resistance characteristics (e.g., are relatively voltage-resistant). The third and fourth additives may be adsorbed on the positive active material via a phosphonic acid group site and may be accepted on the passivation film derived from the first additive, thus forming a dense and low-resistance passivation film and suppressing or reducing the contact between the positive active material and hydrofluoroether.

The first additive may be included in an amount of about 0.01 to about 1.5 wt %, for example, about 0.1 to about 1.4 wt %, about 0.2 to about 1.4 wt %, or about 0.4 to about 1.3 wt %, based on the total weight of the electrolyte solution. When the content of the first additive is within any of these ranges, cycle-life characteristics and storage characteristics of the battery may be remarkably improved.

The second additive may be included in an amount of about 0.05 to about 1.00 wt %, for example, about 0.07 to about 1.00 wt %, about 0.07 to about 0.6 wt %, or about 0.1 to about 0.6 wt %, based on the total weight of the electrolyte solution. When the content of the second additive is within any of these ranges, cycle-life characteristics and storage characteristics of the battery may be remarkably improved.

The third additive may be included in an amount of about 0.04 to about 1.00 wt %, for example, about 0.05 to about 1.00 wt %, about 0.07 to about 1.00 wt %, about 0.07 to about 0.6 wt %, or about 0.1 to about 0.6 wt %, based on the total weight of the electrolyte solution. When the content of the third additive is within any of these ranges, cycle-life characteristics and storage characteristics of the battery may be remarkably improved.

The fourth additive may be included in an amount of about 0.01 to about 1.0 wt %, for example, about 0.05 to about 1.0 wt %, about 0.07 to about 1.0 wt %, about 0.1 to about 0.7 wt %, about 0.1 to about 0.6 wt %, or about 0.1 to about 0.4 wt %, based on the total weight of the electrolyte solution. When the content of the fourth additive is within any of these ranges, cycle-life characteristics and storage characteristics of the battery may be remarkably improved.

The electrolyte solution may further include various additives, in addition to the first to fourth additives of embodiments of the present disclosure. The various additional additives may include an additive functioning for a negative electrode, an additive functioning for a positive electrode, an ester-based additive, a carbonate ester-based additive, a sulfate ester-based additive, a phosphate ester-based additive, a borate ester-based additive, an acid anhydride-based additive, an electrolyte-based additive, and/or the like. In some embodiments, at least one or at least two of such additives may be added to the electrolyte solution.

As described above, the electrolyte solution according to embodiments of the present disclosure including the first additive and at least one selected from the second to fourth additives may remarkably improve cycle-life characteristics and storage characteristics of a rechargeable lithium battery including a positive electrode including a lithium-containing transition metal oxide as a positive active material, and an electrolyte solution including a hydrofluoroether.

Hereinafter, a method of manufacturing a rechargeable lithium battery is described.

The positive electrode 20 is manufactured, for example, by the following method. First, a mixture of a positive active material, a conductive material, and a binder is dispersed in a solvent, for example, N-methyl-2-pyrrolidone, to prepare a slurry. Subsequently, the slurry is applied on a current collector 21 and dried to form a positive active material layer 22. The coating method is not particularly limited, and may include a knife coater method, a gravure coater method, and/or the like. The coating processes described below may be performed according to the same (or substantially the same) method. Subsequently, the positive active material layer 22 is compressed to have a density within a desired or suitable range, thus forming a positive electrode 20.

The negative electrode 30 may be manufactured according to the same (or substantially the same) method as the one used in forming the positive electrode 20. For example, first, a mixture of a negative active material and a binder is dispersed in a solvent of N-methyl-2-pyrrolidone, water, and/or the like to form slurry, and the slurry is coated on a current collector 31, followed by drying the same to form a negative active material layer 32. Subsequently, the negative active material layer 32 is compressed to have a density within the desired or suitable range, thus forming a negative electrode 30.

A separator may be manufactured as follows. First, a resin consisting of a porous layer and a water-soluble organic solvent are mixed in a weight ratio of about 5 to 10/about 90 to 95 to prepare a coating solution. Here, the water-soluble organic solvent may be, for example, N-methyl-2-pyrrolidone, dimethyl acetamide (DMAc), tripropylene glycol (TPG), and/or the like. Subsequently, the coating solution is coated to be about 1 to about 5 μm thick on both sides or on one side of a substrate. The substrate coated with the coating solution is then treated with a coagulation solution to coagulate the resin in the coating solution, thus forming the separator. Here, the treatment of the substrate with the coagulation solution may include, for example, immersing the substrate in the coagulation solution, blowing the coagulation solution to the substrate, and/or the like. The coagulation solution may be obtained by mixing, for example, the water-soluble organic solvent with water. The amount of the water may be in a range of about 40 to about 80 volume % based on the entire volume of the coagulation solution. Subsequently, the separator is washed with water and dried to remove the water and the water-soluble organic solvent from the separator.

The separator is then inserted between the positive electrode 20 and the negative electrode 30, thus manufacturing an electrode structure. When the porous layer is formed on one side of the substrate, the negative electrode 30 is made to face the porous layer. Then, the electrode structure is manufactured to have a desired shape, for example, a shape of a cylinder, a prism, a laminate, a button, and/or the like, and then inserted into a container having the same shape. The electrolyte solution according to embodiments of the present disclosure is then injected into the container in order to impregnate the electrolyte solution into the pores of the separator, thus manufacturing a rechargeable lithium battery.

Hereinafter, the embodiments of the present disclosure are illustrated in more detail with reference to examples. However, these examples are provided for illustrative purposes only, and should not be interpreted as limiting the scope of the present disclosure. Furthermore, what is not described in this disclosure should be apparent to those of ordinary skill in the art of lithium batteries, and accordingly, will not be illustrated here.

Example 1

98 wt % of $LiCoO_2$, 1 wt % of polyvinylidene fluoride, and 1 wt % of ketjen black were dispersed into N-methyl-2-pyrrolidone to prepare a slurry, and the slurry was coated on an aluminum current-collecting film as a current collector and dried, thus forming a positive active material layer. Subsequently, the positive active material layer was pressed to have density of 4.0 g/cm$^3$, thus manufacturing a positive electrode.

90 wt % of a negative active material obtained by mixing a silicon alloy (containing 70 atom % of silicon) and artificial graphite in a weight ratio of 30:70, 7 wt % of polyacrylic acid, and 2 wt % of conductive carbon were dispersed into water to prepare a slurry, and the slurry was coated on an aluminum current collecting film as a current collector and dried, thus forming a negative active material layer. Subsequently, the negative active material layer was pressed with a press to have density of 1.45 g/cm³, thus manufacturing a negative electrode.

A separator (20 μm thick, Mitsubishi Resin, Inc.) was then disposed between the positive electrode and the negative electrode, thus manufacturing an electrode structure.

Subsequently, the electrode structure was inserted into a test container.

A basic electrolyte solution was prepared by mixing fluoroethylene carbonate (FEC), ethylmethylsulfone (EMS), dimethyl carbonate (DMC), and H(CF$_2$)$_2$CH$_2$O(CF$_2$)H as a hydrofluoroether (HFE) in a volume ratio of 12:3:45:40, and dissolving LiPF$_6$ in a concentration of 1.3 mol/L therein. Subsequently, a first additive represented by Chemical Formula 1-1 and a third additive represented by Chemical Formula 3-1 were added to the basic electrolyte solution, thus preparing an electrolyte solution. The first additive was used in an amount of 0.2 wt % based on the entire weight of the electrolyte solution, and the third additive was used in an amount of 0.2 wt % based on the entire weight of the electrolyte solution.

The obtained electrolyte solution was then inserted into the test container and its opening was sealed, thus manufacturing a rechargeable lithium battery cell according to Example 1.

Examples 2 to 18 and Comparative Examples 1 to 10

Rechargeable lithium battery cells were each independently manufactured according to the same (or substantially the same) method as in Example 1, except for changing the kind and amount of the additives as shown in the following Tables 1 and 2.

(Evaluation)
Evaluation 1: SEM Photograph

Figure 2:
FIG. 2 is a scanning electron microscope (SEM) photograph showing a state of the passivation film on the surface of LiCoO$_2$ particle after the rechargeable lithium battery cells according to Example 1 and Comparative Example 1 were stored at 60° C. for 24 hours.
Figure 2:
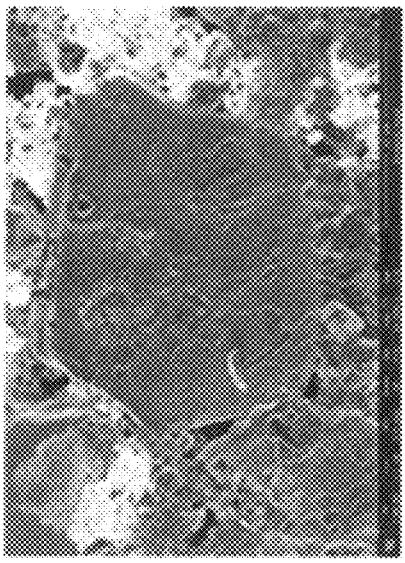
Figure 2:
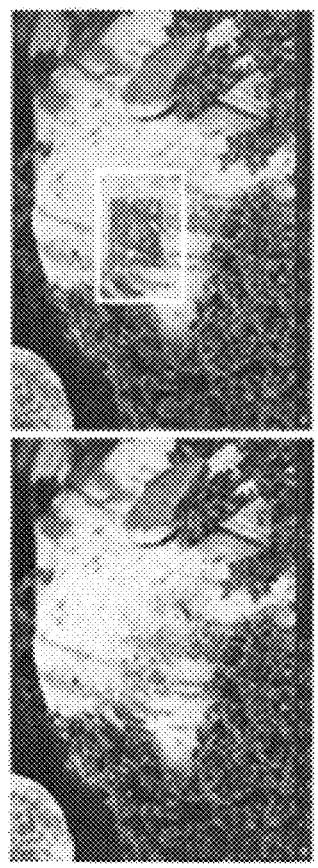

FIG. 2 is a scanning electron microscope (SEM) photograph showing a state of the passivation film on the surface of a LiCoO$_2$ particle after the rechargeable lithium battery cells according to Example 1 and Comparative Example 1 were stored at 60° C. for 24 hours.

Referring to FIG. 2, as for Comparative Example 1, a beam mark on the surface of the LiCoO$_2$ particle was found (the portion of the image surrounded by a white square), when a SEM image was taken. It is therefore believed that in the cell of Comparative Example 1, unlike in the cell of Example 1, the passivation film originating from the hydrofluoroether (HFE), for example, from a decomposition product of the HFE, was formed on the surface of the LiCoO$_2$ particle.

Evaluation 2: Cycle-Life Test

A cycle-life test was performed using the rechargeable lithium battery cells according to Examples 1 to 18 and Comparative Examples 1 to 10.

Specifically, the rechargeable lithium battery cells were respectively constant current/constant voltage charged at 0.2 mA/cm² at 25° C. up to a battery voltage of 4.4 V and discharged down to the battery voltage of 3.0 V. This charge and discharge cycle was performed twice.

Subsequently, the rechargeable lithium battery cells were respectively constant current/constant voltage charged at 2 mA/cm² at 45° C. up to a battery voltage of 4.4 V and constant current discharged at 2 mA/cm² down to the battery voltage of 3.0 V, and this charge and discharge cycle was performed 300 times.

Then, discharge capacity (mAh) at each cycle was measured. This discharge capacity was measured by using TOSCAT-3000 (Toyo System Co., Ltd.).

The following Tables 3 and 4 show capacity retentions of the rechargeable lithium battery cells after 300 cycles (relative to their initial discharge capacity at 45° C. regarded to be 100% capacity) as a cycle test result.

Evaluation 3: Storage Test

A storage test was performed using the rechargeable lithium battery cells according to Examples 1 to 18 and Comparative Examples 1 to 10.

Specifically, the rechargeable lithium battery cells were respectively constant current/constant voltage charged at 0.2 mA/cm² up to a battery voltage of 4.4 V at 25° C. and discharged down to the battery voltage of 3.0 V. This charge and discharge cycle was performed twice, and the discharge capacity at the second cycle was regarded as an initial value of 100% capacity.

Subsequently, the rechargeable lithium battery cells were respectively constant current/constant voltage charged at 0.2 mA/cm² up to a battery voltage of 4.4 V at 25° C., and moved to a 60° C. chamber and allowed to stand for 30 days.

In addition, the rechargeable lithium battery cells were then moved to a 25° C. chamber, allowed to stand for 12 hours, and discharged with a current density of 0.2 mA/cm² down to the battery voltage of 3.0 V. Herein, discharge capacity under these conditions was regarded as residual capacity, and a ratio of this residual capacity relative to the capacity before being stored in the 60° C. chamber (i.e. the initial discharge capacity at the second cycle and 25° C., regarded as 100% capacity) was calculated for each cell and the results are shown in the following Tables 3 and 4.

In addition, an increase ratio of a battery volume before measuring the residual capacity relative to a battery volume before being stored in the 60° C. chamber (regarded as 100% volume) was measured for each cell and the results are shown in Table 4.

TABLE 1

| | Electrolyte solution composition | | | | | | | | |
|---|---|---|---|---|---|---|---|---|---|
| | Basic electrolyte solution (solvent) | | | | | Additive | | | | |
| | | | | | | First | Second | Third | Fourth | Other |
| | LiPF$_6$ (mol/L) | FEC (volume %) | EMS (volume %) | DMC (volume %) | HFE (volume %) | additive (wt %) | additive (wt %) | additive (wt %) | additive (wt %) | additive (wt %) |
| Ex. 1 | 1.3 | 15 | 0 | 45 | 40 | 0.20 (Chemical Formula (CF) 1-1) | — | 0.20 (CF 3-1) | — | — |
| Ex. 2 | 1.3 | 12 | 3 | 45 | 40 | 0.20 (CF 1-1) | 0.20 (CF 2-1) | — | — | — |

TABLE 1-continued

| | Electrolyte solution composition ||||| ||||| |
| | Basic electrolyte solution (solvent) ||||| Additive ||||| |
| | | | | | | First | Second | Third | Fourth | Other |
| | $LiPF_6$ (mol/L) | FEC (volume %) | EMS (volume %) | DMC (volume %) | HFE (volume %) | additive (wt %) | additive (wt %) | additive (wt %) | additive (wt %) | additive (wt %) |
|---|---|---|---|---|---|---|---|---|---|---|
| Ex. 3 | 1.3 | 12 | 3 | 45 | 40 | 0.20 (CF 1-1) | — | 0.40 (CF 3-1) | — | — |
| Ex. 4 | 1.3 | 12 | 3 | 45 | 40 | 0.20 (CF 1-1) | — | — | 0.20 (CF 4-1) | — |
| Ex. 5 | 1.3 | 12 | 3 | 45 | 40 | 0.20 (CF 1-1) | 0.20 (CF 2-1) | 0.20 (CF 3-1) | — | — |
| Ex. 6 | 1.3 | 12 | 3 | 45 | 40 | 0.20 (CF 1-1) | — | — | 0.20 (CF 4-1) | — |
| Ex. 7 | 1.3 | 12 | 3 | 45 | 40 | 0.20 (CF 1-1) | — | 0.20 (CF 3-1) | 0.20 (CF 4-1) | — |
| Ex. 8 | 1.3 | 12 | 3 | 45 | 40 | 0.40 (CF 1-1) | — | 0.20 (CF 3-1) | — | — |
| Ex. 9 | 1.3 | 12 | 3 | 45 | 40 | 0.80 (CF 1-1) | — | 0.20 (CF 3-1) | — | — |
| Ex. 10 | 1.3 | 12 | 3 | 45 | 40 | 1.00 (CF 1-1) | — | 0.20 (CF 3-1) | — | — |
| Ex. 11 | 1.3 | 12 | 3 | 45 | 40 | 0.20 (CF 1-1) | — | 0.20 (CF 3-1) | — | 1 (SN) |
| Ex. 12 | 1.3 | 12 | 3 | 45 | 40 | 0.20 (CF 1-1) | — | 0.20 (CF 3-1) | — | 1 (SN), 1 (VC) |
| Ex. 13 | 1.3 | 12 | 3 | 45 | 40 | 0.20 (CF 1-1) | — | 0.20 (CF 3-1) | — | 1 (SN), 0.3 (LiFOB) |
| Ex. 14 | 1.3 | 12 | 3 | 45 | 40 | 0.20 (CF 1-1) | — | 0.20 (CF 3-1) | — | 1 (SN), 0.5 (LiBOB) |
| Ex. 15 | 1.3 | 12 | 3 | 45 | 40 | 0.05 (CF 1-1) | — | 0.20 (CF 3-1) | — | — |
| Ex. 16 | 1.3 | 12 | 3 | 45 | 40 | 0.10 (CF 1-1) | — | 0.20 (CF 3-1) | — | — |
| Ex. 17 | 1.3 | 12 | 3 | 45 | 40 | 0.14 (CF 1-1) | — | 0.20 (CF 3-1) | — | — |
| Ex. 18 | 1.3 | 12 | 3 | 45 | 40 | 1.30 (CF 1-1) | — | 0.20 (CF 3-1) | — | — |

TABLE 2

| | Electrolyte solution composition ||||| ||||| |
| | Basic electrolyte solution (solvent) ||||| Additive ||||| |
| | | | | | | First | Second | Third | Fourth | Other |
| | $LiPF_8$ (mol/L) | FEC (volume %) | EMS (volume %) | DMC (volume %) | HFE (volume %) | additive (wt %) | additive (wt %) | additive (wt %) | additive (wt %) | additive (wt %) |
|---|---|---|---|---|---|---|---|---|---|---|
| Comp. Ex. 1 | 1.3 | 12 | 3 | 45 | 40 | — | — | — | — | — |
| Comp. Ex. 2 | 1.3 | 12 | 3 | 45 | 40 | — | — | — | — | 3 (SN) |
| Comp. Ex. 3 | 1.3 | 12 | 3 | 45 | 40 | — | — | — | — | 3 (PS) |
| Comp. Ex. 4 | 1.3 | 12 | 3 | 45 | 40 | 0.20 (Chemical Formula (CF) 1-1) | — | — | — | — |
| Comp. Ex. 5 | 1.3 | 12 | 3 | 45 | 40 | — | 0.20 (CF 2-1) | — | — | — |
| Comp. Ex. 6 | 1.3 | 12 | 3 | 45 | 40 | — | — | 0.20 (CF 3-1) | — | — |
| Comp. Ex. 7 | 1.3 | 12 | 3 | 45 | 40 | — | — | — | 0.20 (CF 4-1) | — |
| Comp. Ex. 8 | 1.3 | 12 | 3 | 45 | 40 | — | 0.20 (CF 2-1) | 0.20 (CF 3-1) | — | — |
| Comp. Ex. 9 | 1.3 | 12 | 3 | 45 | 40 | — | 0.20 (CF 2-1) | — | 0.20 (CF 4-1) | — |
| Comp. Ex. 10 | 1.3 | 12 | 3 | 45 | 40 | — | — | 0.20 (CF 3-1) | 0.20 (CF 4-1) | — |

TABLE 3

| | 45° C. cycle test Capacity retention (%@300$^{th}$) | 60° C. * storage test for 30 days | |
|---|---|---|---|
| | | Volume increase ratio VV (%) | Residual capacity (%) |
| Example 1 | 73 | 10 | 70 |
| Example 2 | 78 | 5 | 73 |
| Example 3 | 81 | 2 | 81 |
| Example 4 | 71 | 5 | 74 |
| Example 5 | 77 | 6 | 76 |
| Example 6 | 70 | 3 | 76 |
| Example 7 | 74 | 3 | 74 |
| Example 8 | 83 | 1 | 73 |
| Example 9 | 83 | 1 | 80 |
| Example 10 | 73 | 5 | 74 |
| Example 11 | 78 | 1 | 84 |
| Example 12 | 85 | 1 | 80 |
| Example 13 | 88 | 1 | 90 |
| Example 14 | 89 | 1 | 88 |
| Example 15 | 46 | 44 | 43 |
| Example 16 | 69 | 16 | 61 |
| Example 17 | 70 | 13 | 66 |
| Example 18 | 48 | 2 | 69 |

TABLE 4

| | 45° C. cycle test Capacity retention (%@300$^{th}$) | 60° C. * storage test for 30 days | |
|---|---|---|---|
| | | Volume increase ratio VV (%) | Residual capacity (%) |
| Comparative Example 1 | 35 | 94 | 10 |
| Comparative Example 2 | 42 | 64 | 15 |
| Comparative Example 3 | 30 | 36 | 33 |
| Comparative Example 4 | 53 | 25 | 51 |
| Comparative Example 5 | 42 | 31 | 40 |
| Comparative Example 6 | 38 | 60 | 41 |
| Comparative Example 7 | 42 | 35 | 45 |
| Comparative Example 8 | 39 | 45 | 48 |
| Comparative Example 9 | 44 | 30 | 42 |
| Comparative Example 10 | 40 | 35 | 39 |

In Tables 1 and 2, "SN" refers to succinonitrile, "VC" refers to vinylene carbonate, "PS" refers to 1,3-propane sultone, "LiFOB" refers to lithium difluoro(oxalate)borate, and "LiBOB" refers to lithium bis(oxalate)borate. The amounts of these additives are shown as a unit of wt % based on the total weight of the electrolyte solution (the basic electrolyte solution (solvent)+an additive). Furthermore, "–" indicates that the corresponding additive was not used.

Referring to Tables 3 and 4, most cells of Examples 1 to 18 using the first additive and least one selected from the second to fourth additives showed increased capacity retention after 300 cycles, a low battery volume increase ratio, and increased residual capacity after storage, as compared to the cells of Comparative Examples 1 to 10. Accordingly, cycle-life characteristics and storage characteristics of the battery can be improved by including the first additive and at least one selected from the second to fourth additives according to embodiments of the present disclosure to the basic electrolyte solution.

In addition, when the amount of the first additive was in a narrower range of 0.1 to 1 wt %, for example, 0.2 to 0.8 wt %, or 0.4 to 0.8 wt %, cycle-life characteristics and storage characteristics of the respective batteries were further improved.

Example 19

A rechargeable lithium battery cell was manufactured according to the same (or substantially the same) method as Example 1, except for changing the composition of the basic electrolyte solution and the kind and amount of the additives added to the basic electrolyte solution, relative to Example 1, as shown in the following Table 5.

Examples 20 to 44 and Comparative Example 11

Rechargeable lithium battery cells were each manufactured according to the same (or substantially the same) method as Example 19, except for changing the kind and amount of the additives as shown in the following Table 5.

(Evaluation)
Evaluation 4: Cycle-Life Test

A cycle test using the rechargeable lithium battery cells according to Examples 19 to 44 and Comparative Example 11 was performed.

Specifically, the rechargeable lithium battery cells were respectively constant current/constant voltage charged at 0.2 mA/cm$^2$ at 25° C. up to a battery voltage of 4.4 V and discharged down to the battery voltage of 3.0 V. This charge and discharge cycle was performed twice.

Subsequently, the rechargeable lithium battery cells were respectively constant current/constant voltage charged at 2 mA/cm$^2$ at 45° C. up to a battery voltage of 4.4 V and constant current discharged at 2 mA/cm$^2$ down to the battery voltage of 3.0V, and this charge and discharge cycle was performed 200 times.

Then, discharge capacity (mAh) at each cycle was measured. The discharge capacity was measured by using TOSCAT-3000 (Toyo System Co., Ltd.).

In the following Table 6, capacity retention after 200 cycles (relative to the initial discharge capacity at 45° C. regarded as 100% capacity) is shown as a cycle test result.

Evaluation 5: Storage Test

A storage test using the rechargeable lithium battery cells according to Examples 19 to 44 and Comparative Example 11 was performed.

Specifically, the rechargeable lithium battery cells were respectively constant current/constant voltage charged at 0.2 mA/cm$^2$ at 25° C. up to a battery voltage of 4.4 V and discharged down to the battery voltage of 3.0 V. This charge and discharge cycle was performed twice, and the discharge capacity at the second cycle was regarded as 100% capacity.

Subsequently, the rechargeable lithium battery cells were respectively constant current/constant voltage charged at 0.2 mA/cm$^2$ at 25° C. up to a battery voltage of 4.4 V, and moved to a 60° C. chamber and allowed to stand for 15 days.

In addition, the rechargeable lithium battery cells were then moved to a 25° C. chamber, allowed to stand for 12 hours, and discharged down to a battery voltage of 3.0 V with a current density of 0.2 mA/cm$^2$.

Here, the discharge capacity measured under the foregoing conditions was regarded as residual capacity, and a ratio of this residual capacity relative to the capacity before being stored in the 60° C. chamber (i.e. the initial discharge capacity at the second cycle and at 25° C., regarded as 100% capacity) was measured for each cell and the results are shown in the following Table 6.

In addition, an increase ratio of a battery volume before measuring the residual capacity relative to a battery volume before being stored in the 60° C. chamber (regarded as 100% volume) was measured for each cell and the results are shown in the following Table 6.

TABLE 5

| | Electrolyte solution composition | | | | | | | | | |
|---|---|---|---|---|---|---|---|---|---|---|
| | Basic electrolyte solution (solvent) | | | | | Additive | | | | |
| | | | | | | First | Second | Third | Fourth | Other |
| | $LiPF_6$ (mol/L) | FEC (volume %) | EMS (volume %) | DMC (volume %) | HFE (volume %) | additive (wt %) | additive (wt %) | additive (wt %) | additive (wt %) | additive (wt %) |
| Comp. Ex. 11 | 1.3 | 12 | 3 | 45 | 40 | 0.80 (Chemical Formula (CF) 1-1) | — | — | — | — |
| Ex. 19 | 1.3 | 12 | 3 | 45 | 40 | 0.80 (CF 1-1) | — | 0.20 (CF 3-1) | — | — |
| Ex. 20 | 1.3 | 12 | 3 | 45 | 40 | 0.80 (CF 1-2) | — | 0.20 (CF 3-1) | — | — |
| Ex. 21 | 1.3 | 12 | 3 | 45 | 40 | 0.80 (CF 1-3) | — | 0.20 (CF 3-1) | — | — |
| Ex. 22 | 1.3 | 12 | 3 | 45 | 40 | 0.80 (CF 1-4) | — | 0.20 (CF 3-1) | — | — |
| Ex. 23 | 1.3 | 12 | 3 | 45 | 40 | 0.80 (CF 1-4) | 0.20 (CF 2-1) | — | — | — |
| Ex. 24 | 1.3 | 12 | 3 | 45 | 40 | 0.80 (CF 1-4) | — | 0.20 (CF 3-1) | — | — |
| Ex. 25 | 1.3 | 12 | 3 | 45 | 40 | 0.80 (CF 1-4) | — | — | 0.20 (CF 4-2) | — |
| Ex. 26 | 1.3 | 12 | 3 | 45 | 40 | 0.80 (CF 1-4) | 0.05 (CF 2-1) | — | — | — |
| Ex. 27 | 1.3 | 12 | 3 | 45 | 40 | 0.80 (CF 1-4) | 0.07 (CF 2-1) | — | — | — |
| Ex. 28 | 1.3 | 12 | 3 | 45 | 40 | 0.80 (CF 1-4) | 0.10 (CF 2-1) | — | — | — |
| Ex. 29 | 1.3 | 12 | 3 | 45 | 40 | 0.80 (CF1-4) | 0.38 (CF 2-1) | — | — | — |
| Ex. 30 | 1.3 | 12 | 3 | 45 | 40 | 0.80 (CF 1-4) | 0.60 (CF 2-1) | — | — | — |
| Ex. 31 | 1.3 | 12 | 3 | 45 | 40 | 0.80 (CF 1-4) | 1.00 (CF 2-1) | — | — | — |
| Ex. 32 | 1.3 | 12 | 3 | 45 | 40 | 0.80 (CF 1-4) | — | 0.04 (CF 3-1) | — | — |
| Ex. 33 | 1.3 | 12 | 3 | 45 | 40 | 0.80 (CF 1-4) | — | 0.07 (CF 3-1) | — | — |
| Ex. 34 | 1.3 | 12 | 3 | 45 | 40 | 0.80 (CF 1-4) | — | 0.10 (CF 3-1) | — | — |
| Ex. 35 | 1.3 | 12 | 3 | 45 | 40 | 0.80 (CF 1-4) | — | 0.40 (CF 3-1) | — | — |
| Ex. 36 | 1.3 | 12 | 3 | 45 | 40 | 0.80 (CF 1-4) | — | 0.60 (CF 3-1) | — | — |
| Ex. 37 | 1.3 | 12 | 3 | 45 | 40 | 0.80 (CF 1-4) | — | 1.00 (CF 3-1) | — | — |
| Ex. 38 | 1.3 | 12 | 3 | 45 | 40 | 0.80 (CF 1-4) | — | — | 0.05 (CF 4-2) | — |
| Ex. 39 | 1.3 | 12 | 3 | 45 | 40 | 0.80 (CF 1-4) | — | — | 0.07 (CF 4-2) | — |
| Ex. 40 | 1.3 | 12 | 3 | 45 | 40 | 0.80 (CF 1-4) | — | — | 0.10 (CF 4-2) | — |
| Ex. 41 | 1.3 | 12 | 3 | 45 | 40 | 0.80 (CF 1-4) | — | — | 0.40 (CF 4-2) | — |
| Ex. 42 | 1.3 | 12 | 3 | 45 | 40 | 0.80 (CF 1-4) | — | — | 0.60 (CF 4-2) | — |
| Ex. 43 | 1.3 | 12 | 3 | 45 | 40 | 0.80 (CF 1-4) | — | — | 0.66 (CF 4-2) | — |
| Ex. 44 | 1.3 | 12 | 3 | 45 | 40 | 0.80 (CF 1-4) | — | — | 1.00 (CF 4-2) | — |

TABLE 6

| | 45° C. cycle test Capacity retention (%@200$^{th}$) | 60° C. * storage test for 15 days | |
|---|---|---|---|
| | | Volume increase ratio VV (%) | Residual capacity (%) |
| Comparative Example 11 | 65 | 15 | 60 |
| Example 19 | 84 | 3 | 84 |
| Example 20 | 82 | 4 | 79 |
| Example 21 | 85 | 2 | 72 |
| Example 22 | 86 | 2 | 88 |
| Example 23 | 77 | 2 | 78 |
| Example 24 | 85 | 2 | 81 |
| Example 25 | 81 | 2 | 79 |
| Example 26 | 62 | 12 | 62 |
| Example 27 | 70 | 7 | 68 |
| Example 28 | 74 | 3 | 77 |
| Example 29 | 83 | 2 | 85 |
| Example 30 | 73 | 1 | 84 |
| Example 31 | 66 | 0 | 75 |
| Example 32 | 62 | 9 | 62 |
| Example 33 | 68 | 8 | 68 |
| Example 34 | 73 | 5 | 68 |
| Example 35 | 80 | 2 | 85 |
| Example 36 | 73 | 0 | 84 |
| Example 37 | 68 | 0 | 72 |
| Example 38 | 58 | 16 | 53 |
| Example 39 | 63 | 11 | 63 |
| Example 40 | 76 | 6 | 74 |
| Example 41 | 71 | 2 | 73 |
| Example 42 | 69 | 1 | 66 |
| Example 43 | 57 | 1 | 41 |
| Example 44 | 47 | 1 | 41 |

In Table 5, the amounts of the respective components indicate wt % based on the total weight of the electrolyte solution (a basic electrolyte solution+an additive). In addition, "–" indicates that the corresponding additive was not added.

Referring to Table 6, the first additives showed improved cycle-life characteristics and storage characteristics in the following order from the most to least improvement: Chemical Formula 1-4 (e.g., in Example 22)>Chemical Formula 1-3 (e.g., in Example 21)>Chemical Formula 1-1 (e.g., in Example 19)>Chemical Formula 1-2 (e.g., in Example 20).

In addition, when the second additive was used in a narrower range of 0.07 to 1 wt %, for example, 0.07 to 0.4 wt %, or 0.1 to 0.4 wt %, cycle-life characteristics and storage characteristics of the batteries were further improved.

Furthermore, when the third additive was used in a narrower range of 0.07 to 1 wt %, for example, 0.07 to 0.6 wt %, or 0.1 to 0.6 wt %, cycle-life characteristics and storage characteristics of the batteries were further improved.

In addition, when the fourth additive was used in a narrower range of 0.1 to 0.6 wt %, for example, 0.1 to 0.4 wt %, cycle-life characteristics and storage characteristics of the batteries were further improved.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims and equivalents thereof.

As used herein, expressions such as "at least one of," "one of," "at least one selected from," and "one selected from," when preceding a list of elements, modify the entire list of elements and do not modify the individual elements of the list. Further, the use of "may" when describing embodiments of the present invention refers to "one or more embodiments of the present invention."

In addition, as used herein, the terms "use," "using," and "used" may be considered synonymous with the terms "utilize," "utilizing," and "utilized," respectively.

As used herein, the terms "substantially," "about," and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

DESCRIPTION OF SOME OF THE SYMBOLS 10 rechargeable lithium battery
20 positive electrode
21 current collector
22 positive active material layer
30 negative electrode
31 current collector
32 negative active material layer
40 separator layer

What is claimed is:

1. A rechargeable lithium battery, comprising:
a positive electrode comprising a positive active material; and
an electrolyte solution comprising a solvent and an additive,
wherein the positive active material comprises a lithium-containing transition metal oxide,
the solvent comprises a hydrofluoroether in an amount of about 10 to about 60 volume % based on the total volume of the solvent, and
the additive comprises:
a first additive represented by Chemical Formula 1 in an amount of about 0.01 to about 1.5 wt % based on the total weight of the electrolyte solution, and
at least one additional additive selected from the group consisting of an additive represented by Chemical Formula 2, an additive represented by Chemical Formula 3, and an additive represented by Chemical Formula 4:

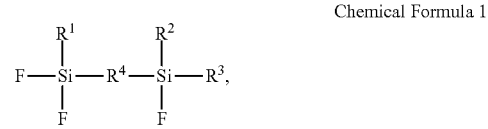

Chemical Formula 1 wherein, in Chemical Formula 1,
$R^1$ to $R^3$ are each independently selected from a C1 to C8 alkyl group substituted or unsubstituted with a vinyl group or a C1 to C5 alkyl group and not including a double bond, a C1 to C8 alkyl group substituted or unsubstituted with a vinyl group or a C1 to C5 alkyl group and including a double bond, a C2 to C8 alkenyl group, a C5 to C8 cycloalkyl group, a C6 to C8 aryl group, and a fluorine atom, and $R^4$ is selected from a C2 to C8 alkynylene group, a C4 to C8 alkylene group having two more ether groups and/or at least one thioether group, a C1 to C8 alkylene group having two or more of —$CF_2$— linking groups, and a C4 to C10 alkylene group having an ether group and a thioether group, Chemical Formula 2

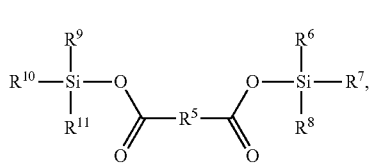

wherein, in Chemical Formula 2, $R^5$ is selected from a C2 to C6 alkylene group without a double bond, a C2 to C6 alkylene group with a double bond, and a C6 to C12 arylene group, and $R^6$ to $R^{11}$ are each independently selected from a C1 to C6 alkyl group and a C2 to C6 alkenyl group, Chemical Formula 3

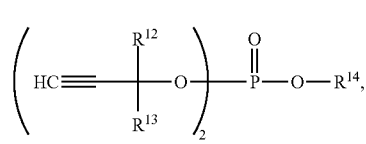

wherein, in Chemical Formula 3, $R^{12}$ and $R^{13}$ are each independently selected from hydrogen and a C1 to C8 alkyl group, and $R^{14}$ is selected from a C1 to C8 alkyl group substituted or unsubstituted with a vinyl group, a C2 to C8 alkenyl group, a C2 to C8 alkynyl group, and a C1 to C8 halogenated alkyl group, Chemical Formula 4

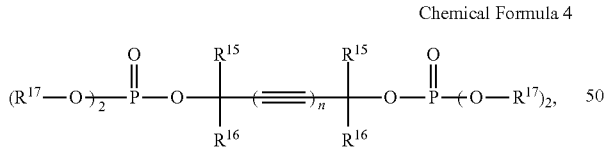

wherein, in Chemical Formula 4, $R^{15}$ and $R^{16}$ are each independently selected from hydrogen and a C1 to C8 alkyl group, $R^{17}$ is selected from a C1 to C8 alkyl group, a C2 to C8 alkenyl group, a C2 to C8 alkynyl group, and a C1 to C8 halogenated alkyl group, and n is 1 or 2.

2. The rechargeable lithium battery of claim 1, wherein the hydrofluoroether comprises 2,2,2-trifluoroethylmethylether ($CF_3CH_2OCH_3$), 2,2,2-trifluoroethyldifluoromethylether ($CF_3CH_2OCHF_2$), 2,2,3,3,3-pentafluoropropylmethylether ($CF_3CF_2CH_2OCH_3$), 2,2,3,3,3-pentafluoropropyldifluoromethylether ($CF_3CF_2CH_2OCHF_2$), 2,2,3,3,3-pentafluoropropyl-1,1,2,2-tetrafluoroethylether ($CF_3CF_2CH_2OCF_2CF_2H$), 1,1,2,2-tetrafluoroethylmethylether ($HCF_2CF_2OCH_3$), 1,1,2,2-tetrafluoroethylethylether ($HCF_2CF_2OCH_2CH_3$), 1,1,2,2-tetrafluoroethylpropylether ($HCF_2CF_2OC_3H_7$), 1,1,2,2-tetrafluoroethylbutylether ($HCF_2CF_2OC_4H_9$), 2,2,3,3-tetrafluoroethyldifluoromethylether ($H(CF_2)_2CH_2O(CF_2)H$), 1,1,2,2-tetrafluoroethylisobutylether ($HCF_2CF_2OCH_2CH(CH_3)_2$), 1,1,2,2-tetrafluoroethylisopentylether ($HCF_2CF_2OCH_2C(CH_3)_3$), 1,1,2,2-tetrafluoroethyl-2,2,2-trifluoroethylether ($HCF_2CF_2OCH_2CF_3$), 1,1,2,2-tetrafluoroethyl-2,2,3,3-tetrafluoropropylether ($HCF_2CF_2OCH_2CF_2CF_2H$), hexafluoroisopropylmethylether (($CF_3)_2CHOCH_3$), 1,1,3,3,3-pentafluoro-2-trifluoromethylpropylmethylether (($CF_3)_2CHCF_2OCH_3$), 1,1,2,3,3,3-hexafluoropropylmethylether ($CF_3CHFCF_2OCH_3$), 1,1,2,3,3,3-hexafluoropropylethylether ($CF_3CHFCF_2OCH_2CH_3$), 2,2,3,4,4,4-hexafluorobutyldifluoromethylether ($CF_3CHFCF_2CH_2OCHF_2$), or a mixture thereof.

3. The rechargeable lithium battery of claim 1, wherein the additive comprises the first additive and the additive represented by Chemical Formula 2, and the additive represented by Chemical Formula 2 is included in an amount of about 0.05 to about 1.00 wt % based on the total weight of the electrolyte solution.

4. The rechargeable lithium battery of claim 1, wherein the additive comprises the first additive and the additive represented by Chemical Formula 3, and the additive represented by Chemical Formula 3 is included in an amount of about 0.04 to about 1.00 wt % based on the total weight of the electrolyte solution.

5. The rechargeable lithium battery of claim 1, wherein the additive comprises the first additive and the additive represented by Chemical Formula 4, and the additive represented by Chemical Formula 4 is included in an amount of about 0.01 to about 1.00 wt % based on the total weight of the electrolyte solution.

6. The rechargeable lithium battery of claim 1, wherein the additive represented by Chemical Formula 2 is selected from a compound represented by Chemical Formula 2-1, a compound represented by Chemical Formula 2-2, and mixtures thereof:

Chemical Formula 2-1

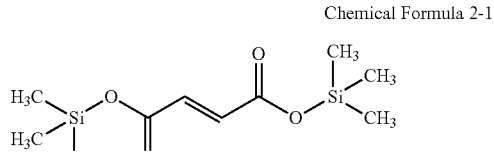

Chemical Formula 2-2

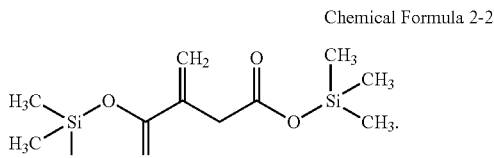

7. The rechargeable lithium battery of claim 1, wherein the additive represented by Chemical Formula 3 comprises at least one selected from compounds represented by Chemical Formulae 3-1 to 3-8:

Chemical Formula 3-1

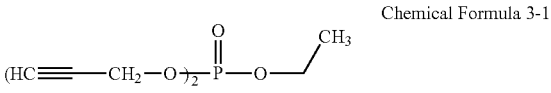

Chemical Formula 3-2
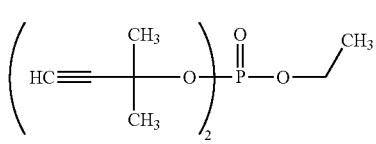

Chemical Formula 3-3
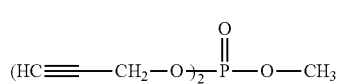

Chemical Formula 3-4
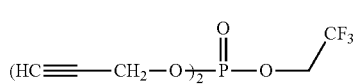

Chemical Formula 3-5
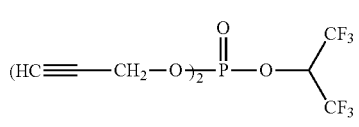

Chemical Formula 3-6
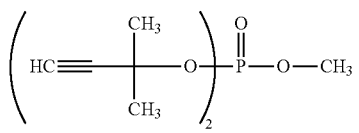

Chemical Formula 3-7
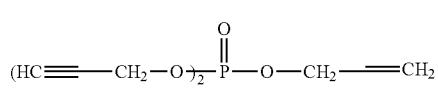

Chemical Formula 3-8
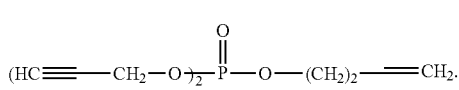

8. The rechargeable lithium battery of claim 1, wherein the additive represented by Chemical Formula 4 comprises at least one selected from compounds represented by Chemical Formulae 4-1 to 4-4:

Chemical Formula 4-1
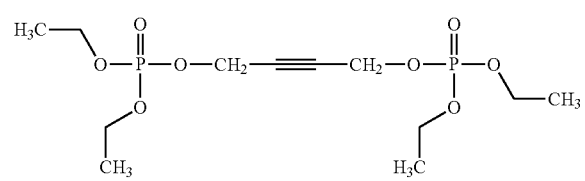

Chemical Formula 4-2
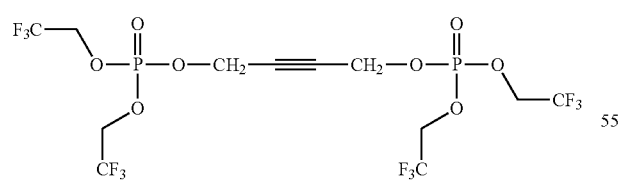

Chemical Formula 4-3
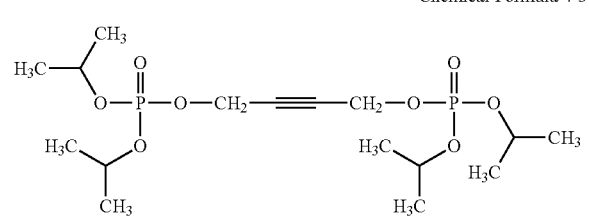

Chemical Formula 4-4
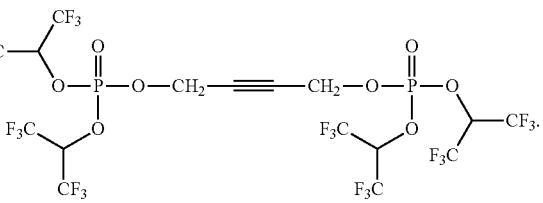

9. The rechargeable lithium battery of claim 1, wherein the lithium-containing transition metal oxide is a lithium cobalt-based composite oxide.

10. The rechargeable lithium battery of claim 1, wherein the rechargeable lithium battery comprises a negative electrode including a negative active material, and
wherein the negative active material comprises at least one selected from a carbon-based material, a silicon-based material, a tin-based material, a lithium metal oxide, and a metal lithium.

11. The rechargeable lithium battery of claim 1, wherein the solvent further comprises fluoroethylene carbonate.

12. The rechargeable lithium battery of claim 11, wherein the fluoroethylene carbonate is included in an amount of about 10 to about 30 volume % based on the total volume of the solvent.

13. The rechargeable lithium battery of claim 1, wherein an oxidation-reduction potential of the rechargeable lithium battery is greater than or equal to about 4.3 V (vs. Li/Li$^+$) and less than or equal to about 5.0 V.

14. A rechargeable lithium battery, comprising:
a positive electrode comprising a positive active material; and
an electrolyte solution comprising a solvent and an additive,
wherein the positive active material comprises a lithium-containing transition metal oxide,
the solvent comprises a hydrofluoroether in an amount of about 10 to about 60 volume % based on the total volume of the solvent, and
the additive comprises:
a first additive comprising at least one selected from compounds represented by Chemical Formulae 1-1, 1-2, 1-4, and 1-6 to 1-9, the first additive being in an amount of about 0.01 to about 1.5 wt % based on the total weight of the electrolyte solution, and
at least one additional additive selected from the group consisting of an additive represented by Chemical Formula 2, an additive represented by Chemical Formula 3, and an additive represented by Chemical Formula 4:

Chemical Formula 1-1
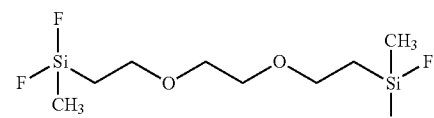

Chemical Formula 1-2
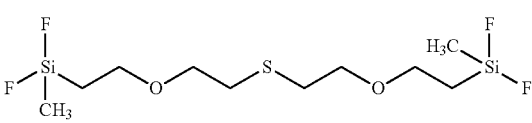

-continued

Chemical Formula 1-4
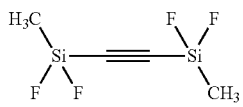

Chemical Formula 1-6
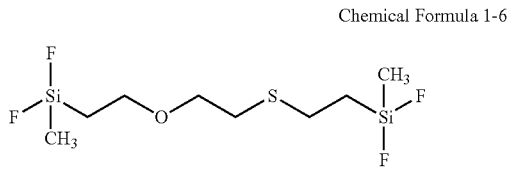

Chemical Formula 1-7
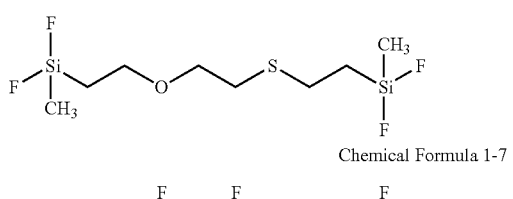

Chemical Formula 1-8
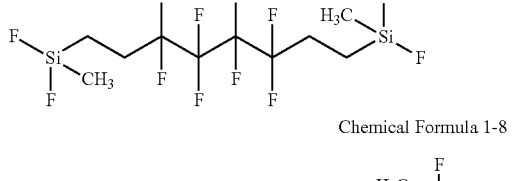

Chemical Formula 1-9
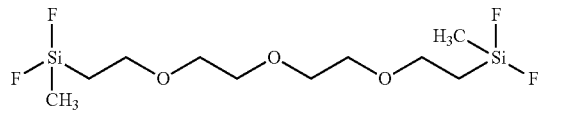

Chemical Formula 2
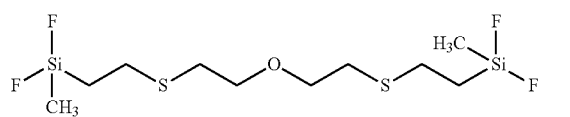

wherein, in Chemical Formula 2,
$R^5$ is selected from a C2 to C6 alkylene group without a double bond, a C2 to C6 alkylene group with a double bond, and a C6 to C12 arylene group, and
$R^6$ to $R^{11}$ are each independently selected from a C1 to C6 alkyl group and a C2 to C6 alkenyl group, Chemical Formula 3
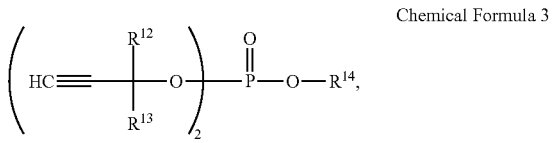

wherein, in Chemical Formula 3,
$R^{12}$ and $R^{13}$ are each independently selected from hydrogen and a C1 to C8 alkyl group, and
$R^{14}$ is selected from a C1 to C8 alkyl group substituted or unsubstituted with a vinyl group, a C2 to C8 alkenyl group, a C2 to C8 alkynyl group, and a C1 to C8 halogenated alkyl group, Chemical Formula 4
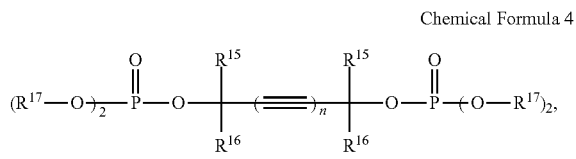

wherein, in Chemical Formula 4,
$R^{15}$ and $R^{16}$ are each independently selected from hydrogen and a C1 to C8 alkyl group,
$R^{17}$ is selected from a C1 to C8 alkyl group, a C2 to C8 alkenyl group, a C2 to C8 alkynyl group, and a C1 to C8 halogenated alkyl group, and
n is 1 or 2.

* * * * *